US010006792B2

(12) United States Patent
Morinaga et al.

(10) Patent No.: US 10,006,792 B2
(45) Date of Patent: Jun. 26, 2018

(54) THERMAL-TYPE AIRFLOW METER

(71) Applicant: Mitsubishi Electric Corporation, Tokyo (JP)

(72) Inventors: Naoki Morinaga, Tokyo (JP); Masahiro Kawai, Tokyo (JP); Yuji Ariyoshi, Tokyo (JP); Shinichiro Hidaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 15/335,750

(22) Filed: Oct. 27, 2016

(65) Prior Publication Data

US 2017/0343400 A1 Nov. 30, 2017

(30) Foreign Application Priority Data

May 26, 2016 (JP) .................................. 2016-104805

(51) Int. Cl.
| | |
|---|---|
| *G01F 1/696* | (2006.01) |
| *F02D 41/18* | (2006.01) |
| *G01F 1/684* | (2006.01) |
| *G01F 5/00* | (2006.01) |
| *F02D 41/28* | (2006.01) |

(52) U.S. Cl.
CPC ........... *G01F 1/696* (2013.01); *F02D 41/187* (2013.01); *G01F 1/6842* (2013.01); *G01F 5/00* (2013.01); *F02D 2041/285* (2013.01)

(58) Field of Classification Search
CPC .......... G01F 1/696; G01F 5/00; G01F 1/6842; F02D 41/187; F02D 41/18; F02M 35/10386
See application file for complete search history.

(56) References Cited

U.S. PATENT DOCUMENTS

| | | | | |
|---|---|---|---|---|
| 6,981,411 B2 * | 1/2006 | Konzelmann | ......... | G01F 1/6845 |
| | | | | 73/204.26 |
| 7,201,048 B2 * | 4/2007 | Renninger | ............ | G01F 1/6845 |
| | | | | 73/204.15 |

(Continued)

FOREIGN PATENT DOCUMENTS

JP 5558599 B1 7/2014

*Primary Examiner* — Freddie Kirkland, III
(74) *Attorney, Agent, or Firm* — Sughrue Mion, PLLC; Richard C. Turner

(57) ABSTRACT

There is provided a thermal-type airflow meter that reduces the number of output signals of the sensor circuit and that can suppress the accuracy of flow rate detection from being deteriorated because due to a nonlinear sensor output characteristic and a response delay in the output signal, the output signal shifts toward the positive side or the negative side. A thermal-type airflow meter outputs one or both of a positive-side comparison signal that is at the positive side of a comparison threshold value and a negative-side comparison signal that is at the negative side of the comparison threshold value, outputs a coefficient multiplication signal obtained by multiplying an average signal acquired by averaging the comparison signal by an adjustment coefficient, and outputs, as a flow rate signal, a value obtained by applying the coefficient multiplication signal to increase correction or decrease correction of the amplitude increase signal.

10 Claims, 16 Drawing Sheets

(56) References Cited

U.S. PATENT DOCUMENTS

| | | | | |
|---|---|---|---|---|
| 8,899,103 B2* | 12/2014 | Ariyoshi | .................... | G01F 5/00 |
| | | | | 73/114.34 |
| 9,163,964 B2* | 10/2015 | Schneider | ................. | G01F 1/00 |
| 9,625,292 B2* | 4/2017 | Hidaka | ............ | F02M 35/10386 |
| 9,719,836 B2* | 8/2017 | Kohno | .................... | F02D 41/18 |
| 9,869,573 B2* | 1/2018 | Kawai | ....................... | G01F 1/69 |
| 2014/0224004 A1 | 8/2014 | Ariyoshi et al. | | |

* cited by examiner

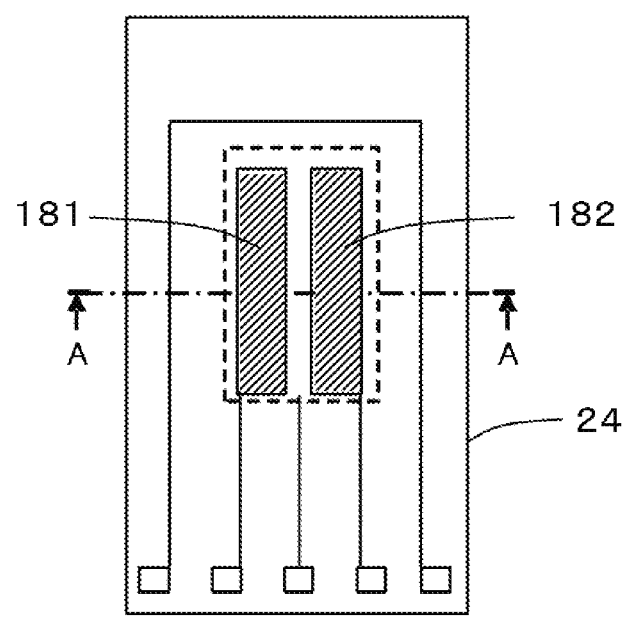

FIG. 16
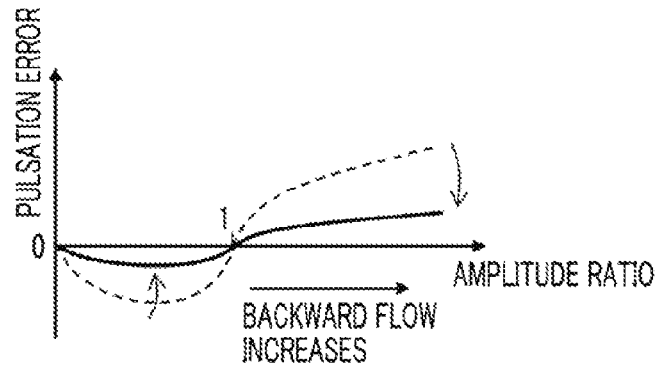
FIG. 17
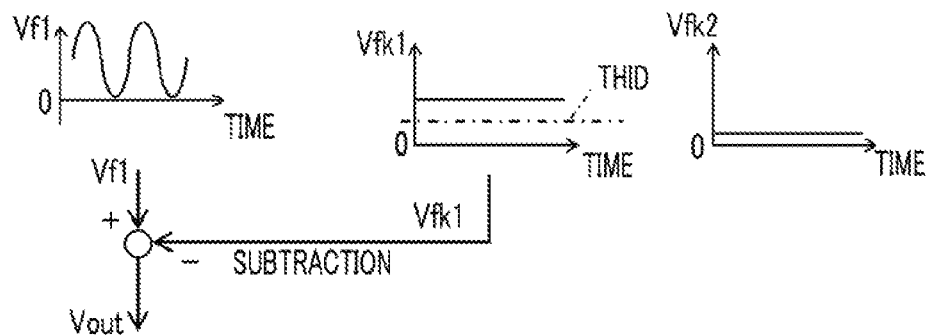
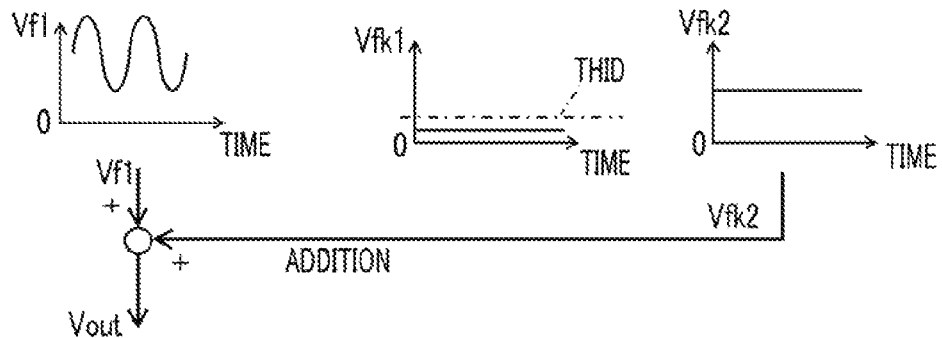

THERMAL-TYPE AIRFLOW METER

INCORPORATION BY REFERENCE

The disclosure of Japanese Patent Application No. 2016-104805 filed on May 26, 2016 including its specification, claims and drawings, is incorporated herein by reference in its entirety.

BACKGROUND

The present invention relates to a thermal-type airflow meter that detects the flow rate of intake air in an internal combustion engine.

In an electronically controlled fuel injection system of an internal combustion engine mounted in an automobile or the like, a thermal-type airflow meter capable of measuring a mass flow rate of intake air has widely been utilized. However, under a driving condition where the rotation speed of an internal combustion engine is low and the load is high, a pulsation flow accompanied by a backward flow occurs. Accordingly, in a conventional thermal-type airflow meter that cannot detect a backward flow, a large flow rate detection error occurs. In order to reduce the flow rate detection error at a time when a pulsation flow accompanied by a backward flow is measured, there has been proposed a method in which the direction of an air flow is detected and when a backward flow is detected, a flow rate signal is corrected.

For example, as represented in FIGS. 4 and 5 of Japanese Patent No. 5558599, the bridge circuit of a sensor unit is configured with an upstream heating resistor 61, a downstream heating resistor 62, an intake-air temperature detection resistor 9, fixed resistors 10, 11 and 12, and the like. As the main output signal for detecting the flow rate, the output signal Vm of the bridge circuit is utilized. However, the flowing direction cannot be determined from the output signal Vm of the bridge circuit; therefore, in addition to the output signal Vm, the intermediate electric potential between the upstream heating resistor 61 and the downstream heating resistor 62 is outputted as a backward flow signal Vd1 indicating a backward flow rate. Then, a signal obtained by subtracting the backward flow signal Vd1 from the output signal Vm of the bridge circuit is outputted as a flow rate signal Vout.

However, because in the technology disclosed in Japanese Patent No. 5558599, two signals, i.e., the output signal Vm of the bridge circuit and the backward flow signal Vd1 are utilized, the circuit configuration is complicated and upsized, thereby hindering the cost saving and the downsizing. Moreover, the variations in the electronic components that create the output signal Vm of the bridge circuit and the variations in the electronic components that create the backward flow signal Vd1 provide respective effects to the foregoing signals; thus, the accuracy of the whole signal cannot readily be maintained.

Furthermore, in the technology disclosed in Japanese Patent No. 5558599, it is not taken into consideration that because the output characteristic of the sensor unit is nonlinear and the output signal of the sensor unit has a response delay caused by a heat capacity, the output signal of the sensor unit shifts toward the positive side or the negative side; thus, there has been a problem that the accuracy of the flow rate signal is deteriorated.

Therefore, there is required a thermal-type airflow meter that reduces the number of output signals of the sensor unit and that can suppress the accuracy of flow rate detection from being deteriorated because due to the nonlinear sensor output characteristic and the response delay of the output signal, the output signal shifts toward the positive side or the negative side.

SUMMARY

A thermal-type airflow meter according to the present invention includes
a bypass flow path that is disposed in an intake pipe through which intake air to be taken into an internal combustion engine flows, that takes in part of the intake air, and that makes the intake air flow therethrough,
a sensor circuit having a flow rate detection device disposed in the bypass flow path, and
a signal processing calculator that processes an output signal of the sensor circuit,
wherein the bypass flow path makes air flow in a direction that corresponds to a forward flow direction or a backward flow direction of the intake air in the intake pipe,
wherein the sensor circuit has, as the flow rate detection device, an upstream heating resistor, which is a heating resistor at the upstream side in the forward flow direction, and a downstream heating resistor, which is a heating resistor disposed at the downstream side of the upstream heating resistor in the forward flow direction, and has a differential current output circuit that creates an output signal in accordance with the difference between an upstream current that flow in the upstream heating resistor in order to maintain the voltage across the upstream heating resistor to be a preliminarily set upstream voltage value and a downstream current that flows in the downstream heating resistor in order to maintain the voltage across the downstream heating resistor to be a preliminarily set downstream voltage value,
wherein the signal processing calculator includes
a response correction calculator that outputs an amplitude increase signal obtained by applying amplitude increase processing of AC components to an output signal of the sensor circuit,
a comparison signal output calculator that compares the amplitude increase signal with a preliminarily set comparison threshold value and then outputs one or both of a negative-side comparison signal in accordance with the negative portion, of the amplitude increase signal, that is at the negative side of the comparison threshold value and a positive-side comparison signal in accordance with the positive portion, of the amplitude increase signal, that is at the positive side of the comparison threshold value,
an averaging processing calculator that outputs an average signal obtained by averaging the comparison signal,
a coefficient multiplication processing calculator that outputs a coefficient multiplication signal obtained by multiplying the average signal by a preliminarily set adjustment coefficient, and
a signal correction processing calculator that outputs, as a flow rate signal, a value obtained by applying decrease processing or increase processing to the amplitude increase signal by the coefficient multiplication signal.

In the thermal-type airflow meter according to the present invention, the flow rate detection device in the sensor unit includes such an upstream heating resistor, a downstream heating resistor, and a differential current output circuit as described above; therefore, by use of a single output signal of the differential current output circuit, a forward flow rate and a downstream flow rate can be detected under the condition that discrimination between a forward flow direction or a backward flow direction can be performed. As a result, the number of output signals of the sensor unit can be reduces to one; thus, downsizing and cost saving of the sensor unit can be performed.

The response correction unit makes the amplitude of the AC components of a pulsation flow included in the output signal increase, so that the effect of a response delay in the sensor unit can be reduced. Moreover, one of or both a negative-side comparison signal and a positive-side comparison signal, obtained by comparing the amplitude increase signal with the comparison threshold value, are outputted, so that a component corresponding to one of or both a backward flow rate and a forward flow rate can be extracted. By outputting the average signal obtained by averaging the comparison signal, a signal corresponding to one of or both the average value of a backward flow rate and the average value of a forward flow rate can be outputted. By outputting the coefficient multiplication signal obtained by multiplying the average signal by the adjustment coefficient, a signal corresponding to the positive-side or negative-side shifting amount, of the detection average flow rate, that is caused by a backward flow rate or a forward flow rate can be outputted. Then, by outputting, as the flow rate signal, a value obtained by applying the coefficient multiplication signal to decrease correction or increase correction of the amplitude increase signal, the positive side or negative-side shifting amount, of the detection average flow rate, that is caused by a backward flow rate or a forward flow rate can be reduced; thus, the accuracy of detecting a flow rate can be suppressed from being deteriorated by the shifting.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 2 is a plan view of a flow rate detection device according to Embodiment 1 of the present invention;

FIG. 16 is a graph for explaining reduction of a pulsation error according to Embodiment 3 of the present invention;

FIG. 17 is a set of charts for explaining determination on switching between decrease correction and increase correction according to Embodiment 3 of the present invention;

DETAILED DESCRIPTION OF THE EMBODIMENTS

1. Embodiment 1

Figure 1:
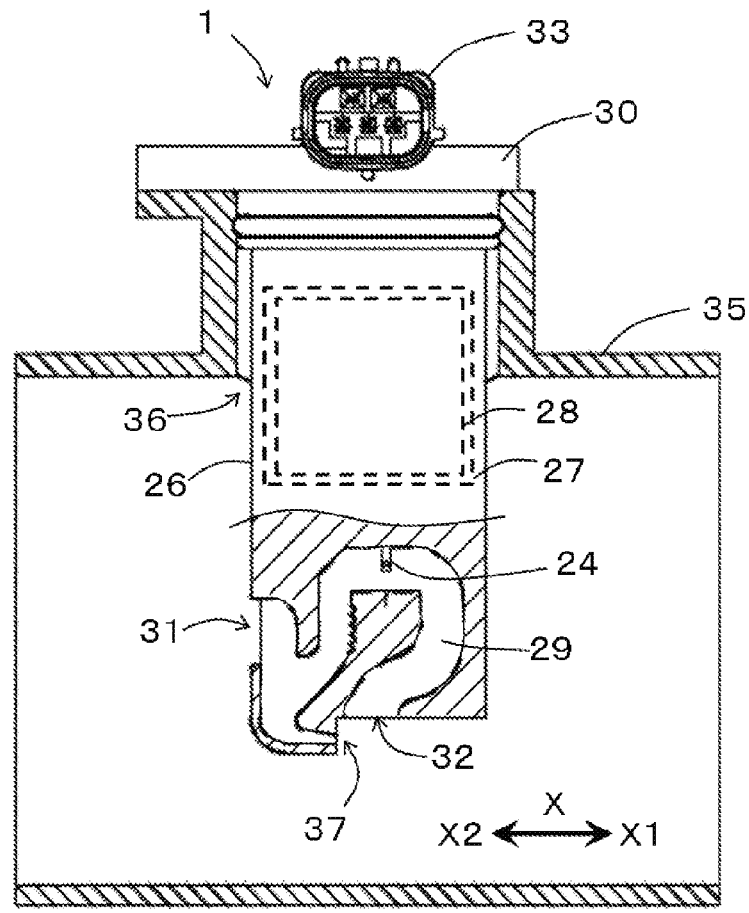
FIG. 1 is a side cross-sectional view of a thermal-type airflow meter according to Embodiment 1 of the present invention.

A thermal-type airflow meter 1 according to Embodiment 1 will be explained with reference to drawings. The thermal-type airflow meter 1 is mounted on an intake pipe 35 through which intake air to be taken into an internal combustion engine flows. FIG. 1 is a side cross-sectional view, of the thermal-type airflow meter 1 mounted on the intake pipe 35, taken along a plane parallel to a flowing direction X of intake air. A flange portion 30 of the thermal-type airflow meter 1 is fixed to the intake pipe 35 in such a way that a main body 26 of the thermal-type airflow meter 1 is inserted into the intake pipe 35 through an insertion hole 36 provided in the intake pipe 35.

The thermal-type airflow meter 1 is provided with a bypass flow path 29 that is disposed in the intake pipe 35, takes in part of intake air flowing in the intake pipe 35, and makes the intake air flow therethrough, a sensor unit 25 having a flow rate detection device 24 disposed in the bypass flow path 29, and a signal processing unit 3 that processes an output signal Vm of the sensor unit 25.

In the main body 26, a connector portion 33, a circuit containing portion 27, and the bypass flow path 29 are formed along the direction in which the thermal-type airflow meter 1 is inserted into the intake pipe 35. The circuit containing portion 27 contains a circuit board 28 on which a differential current output circuit 18 of the sensor unit 25, described later, and a processing circuit of the signal processing unit 3 are mounted. A driving power source 22 for the circuits and a flow rate signal Vout of the signal processing unit 3 are connected with an external power source and an external controller, respectively, through the connector portion 33.

Bypass Flow Path 29

While the internal combustion engine is operated, intake air in the intake pipe 35 flows in a forward flow direction X1, in general. The forward flow direction X1 is the direction in which air flows from the air inlet of the intake pipe 35 toward the internal combustion engine. However, when a throttle valve provided in a portion, of the intake pipe 35, that is at the downstream side of the thermal-type airflow meter 1 in the forward flow direction X1 opens and hence the difference between the pressures at the upstream side and downstream side of the throttle valve decreases, a pressure pulsation is transmitted from the internal combustion engine to the thermal-type airflow meter 1. The pressure pulsation makes the flow rate of intake air flowing in the vicinity of the thermal-type airflow meter 1 pulsate. When the amplitude of the transmitted pressure pulsation increases, there occurs a section in which a pulsation flow flows in a backward flow direction X2. The backward flow direction X2 is the direction in which air flows from the internal combustion engine to the air inlet of the intake pipe 35.

As described above, due to the effect of the pulsation, intake air in the intake pipe 35 flows not only in the forward flow direction X1 but in the backward flow direction X2. The bypass flow path 29 makes air flow in a direction that corresponds to the forward flow direction X1 or the backward flow direction X2 of the intake air in the intake pipe 35. That is to say, when intake air flows in the forward flow direction X1 in the intake pipe 35, air flows in the forward flow direction X1 in the bypass flow path 29. In contrast, when intake air flows to the backward flow direction X2 in the intake pipe 35, air flows in the backward flow direction X2 in the bypass flow path 29.

In the present embodiment, the bypass flow path 29 includes an air inlet 31 that opens in such a way as to face the upstream side in the forward flow direction X1 and an air outlet 32 that opens in such a way as to face the direction perpendicular to the flowing direction X (in this example, the direction in which the main body 26 is inserted). After flowing into the air inlet 31, part of intake air flowing in the forward flow direction X1 flows in the forward flow direction X1 in the bypass flow path 29; then, after passing through the flow rate detection device 24, the part of intake air exits from the bypass flow path 29 to the intake pipe 35 through the air outlet 32. In contrast, after flowing into the air outlet 32, part of intake air flowing in the backward flow direction X2 flows in the backward flow direction X2 in the bypass flow path 29; then, after passing through the flow rate detection device 24, the part of intake air exits from the bypass flow path 29 to the intake pipe 35 through the air inlet 31. Because the air outlet 32 opens in such a way as to face the direction perpendicular to the flowing direction X, the flow rate of intake air, flowing in the backward flow direction X2, that flows into the air outlet 32 is lower than the flow rate of intake air, flowing in the forward flow direction X1, that flows into the air inlet 31, under the condition that the respective flow rates of the intake air flowing in the forward flow direction X1 and the intake air flowing in the backward flow direction X2 are equal to each other. In the present embodiment, a subsidiary air outlet 37 is provided in the bypass flow path 29; however, it may be allowed that the subsidiary air outlet 37 is not provided.

Sensor Unit 25

Figure 3:
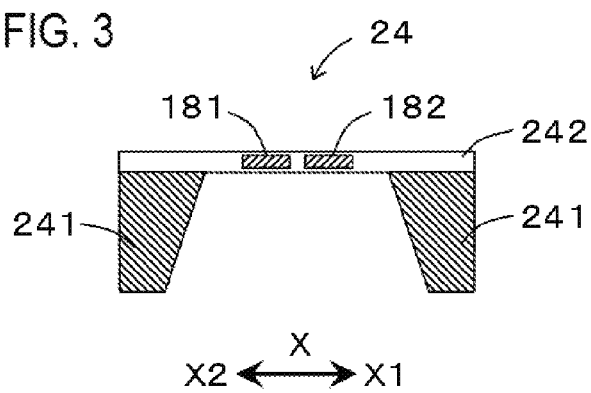
FIG. 3 is a cross-sectional view of the flow rate detection device according to Embodiment 1 of the present invention.

The sensor unit 25 has the flow rate detection device 24 provided in the bypass flow path 29. FIG. 2 is a plan view of the flow rate detection device 24. FIG. 3 is a cross-sectional view, taken along the line A-A of FIG. 2, of the flow rate detection device 24. The sensor unit 25 has, as the flow rate detection device 24, an upstream heating resistor 181, which is a heating resistor at the upstream side in the forward flow direction X1 and a downstream heating resistor 182, which is a heating resistor disposed at the downstream side of the upstream heating resistor 181 in the forward flow direction X1.

In the case where air flows in the forward flow direction X1, the temperature of the upstream heating resistor 181 becomes relatively lower than that of the downstream heating resistor 182. In the case where air flows in the backward flow direction X2, the temperature of the downstream heating resistor 182 becomes relatively lower than that of the upstream heating resistor 181. As the flow rate in the forward flow direction X1 or in the backward flow direction X2 increases, the relative temperature difference increases. The resistance value of each of the heating resistors 181 and 182 decreases as the temperature falls. By utilizing the resistance-value difference caused by the relative temperature difference, the direction of a flow can be detected and the flow rate can be detected; the details thereof will be described.

The flow rate detection device 24 includes a silicon substrate 241 and an insulating film 242 that is formed on the surface of the silicon substrate 241; the upstream heating resistor 181 and the downstream heating resistor 182 are formed in the insulating film 242. The silicon substrate 241 at the rear side of a portion, of the insulating film 242, where the heating resistors 181 and 182 are formed is removed through etching or the like; as a result, the portion where the heating resistors 181 and 182 are formed has a thin-film structure.

Figure 4:
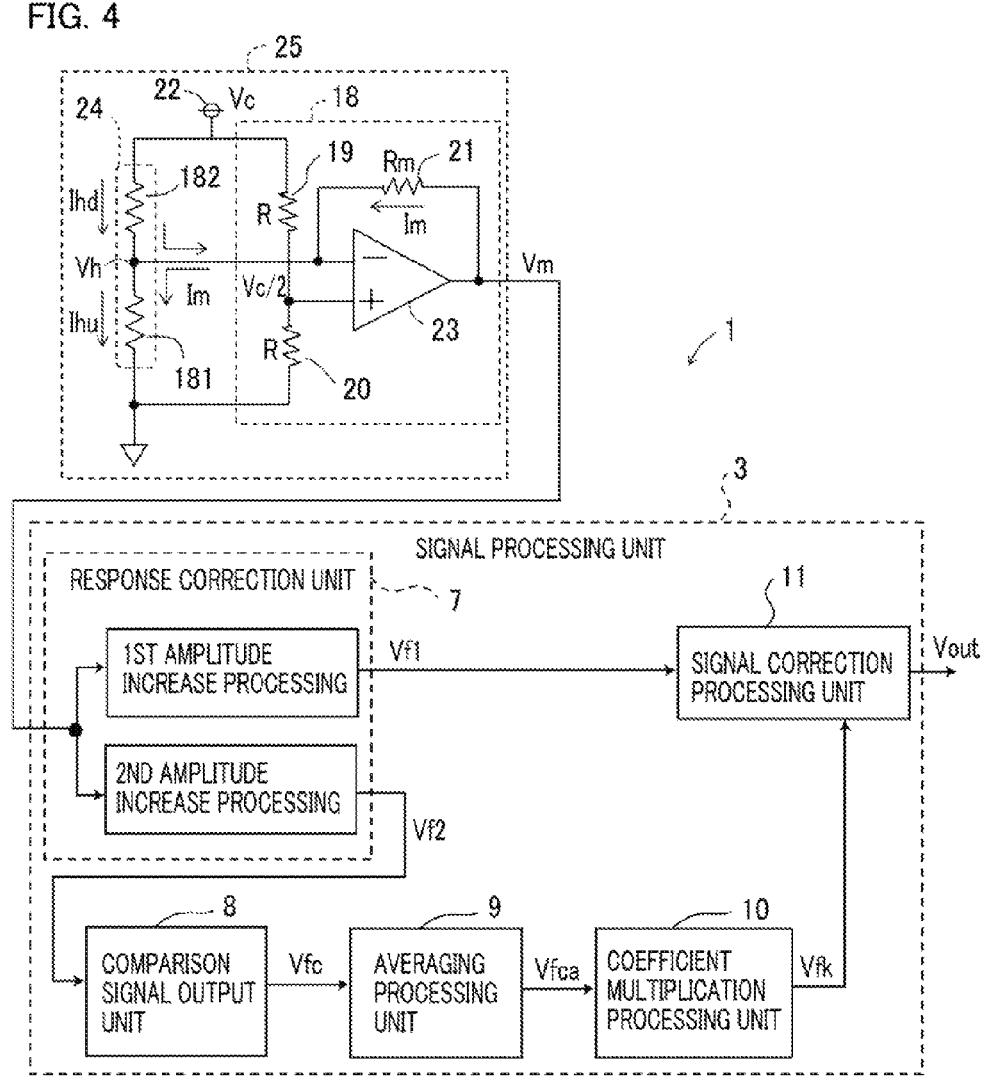
FIG. 4 is a set of a circuit diagram of a sensor unit and a block diagram of a signal processing unit according to Embodiment 1 of the present invention.

FIG. 4 is a set of a circuit diagram of the sensor unit 25 and a block diagram of the signal processing unit 3. The sensor unit 25 has the differential current output circuit 18 that creates the output signal Vm in accordance with the difference between an upstream current Ihu that flows in the upstream heating resistor 181 in order to maintain the voltage across the upstream heating resistor 181 to be a predetermined upstream voltage value and a downstream current Ihd that flows in the downstream heating resistor 182 in order to maintain the voltage across the downstream heating resistor 182 to be a predetermined downstream voltage value.

In the present embodiment, the differential current output circuit 18 includes an upstream fixed resistor 20, a downstream fixed resistor 19, an operational amplifier 23, and an output resistor 21. The output terminal of the operational amplifier 23 and the negative input terminal of the operational amplifier 23 are connected with each other by way of the output resistor 21. Due to this connection, a feedback circuit is configured, so that in the case where a potential difference between the negative input terminal and the positive input terminal of the operational amplifier 23 occurs, an electric current flows in the output resistor 21 so as to cancel the potential difference.

The downstream fixed resistor 19 and the upstream fixed resistor 20 are connected in series and in that order between a power source 22 and the ground. The connection point between the downstream fixed resistor 19 and the upstream fixed resistor 20 is connected with the positive input terminal of the operational amplifier 23. Accordingly, the voltage obtained by dividing the power-source voltage Vc at a division ratio, which is determined by the resistance values of the downstream fixed resistor 19 and the upstream fixed resistor 20, is inputted to the positive input terminal of the operational amplifier 23. The voltage across the upstream fixed resistor 20 at a time when the power-source voltage Vc is divided is the upstream voltage value; the voltage across the downstream fixed resistor 19 at a time when the power-source voltage Vc is divided is the downstream voltage value. In the present embodiment, the upstream fixed resistor 20 and the downstream fixed resistor 19 have a single and the same resistance value R; the upstream voltage value is ½ of the power-source voltage VC, which is equal to the downstream voltage value; ½ of the power-source voltage Vc (Vc/2) is inputted to the positive input terminal of the operational amplifier 23.

The downstream heating resistor 182 and the upstream heating resistor 181 are connected in series and in that order between the power source 22 and the ground. The connect on point between the downstream heating resistor 182 and the upstream heating resistor 181 is connected with the negative input terminal of the operational amplifier 23. Accordingly, the voltage Vh obtained by dividing the power-source voltage Vc at a division ratio, which is determined by the resistance values of the downstream heating resistor 182 and the upstream heating resistor 181, is inputted to the negative input terminal of the operational amplifier 23. In the present embodiment, the downstream heating resistor 182 and the upstream heating resistor 181 have a single and the same resistance value when the respective temperatures of the downstream heating resistor 182 and the upstream heating resistor 181 are the same as each other.

In the case where air flows in the forward flow direction X1, the temperature of the upstream heating resistor 181 relatively falls in comparison with that of the downstream heating resistor 182; therefore, the resistance value of the upstream heating resistor 181 relatively decreases in comparison with that of the downstream heating resistor 182. As a result, the voltage Vh at the negative input terminal of the operational amplifier 23 becomes lower than the voltage (Vc/2) at the positive input terminal of the operational amplifier 23. According the voltage Vm at the output terminal of the operational amplifier 23 becomes higher than the voltage Vh at the negative input terminal; thus, an electric current Im flows through the output resistor 21 from the output terminal to the negative input terminal. The upstream current Ihu that flows in the upstream heating resistor 181 becomes larger than the downstream current Ihd that flows in the downstream heating resistor 182. The electric current Im in the output resistor 21 is given by the equation (1). Because the relative temperature falling amount and the relative resistance value decreasing amount of the upstream heating resistor 181 increase as the flow rate in the forward flow direction X1 increases, the electric current Im increases.

$$Ihu > Ihd$$

$$Im = Ihu - Ihd > 0 \quad (1)$$

In contrast, in the case where air flows in the backward flow direction X2, the temperature of the downstream heating resistor 182 relatively falls in comparison with that of the upstream heating resistor 181; therefore, the resistance value of the downstream heating resistor 182 relatively decreases in comparison with that of the upstream heating resistor 181. As a result, the voltage Vh at the negative input terminal of the operational amplifier 23 becomes higher than the voltage (Vc/2) at the positive input terminal of the operational amplifier 23. Accordingly, the voltage Vm at the output terminal of the operational amplifier 23 becomes lower than the voltage Vh at the negative input terminal; thus, the electric current Im flows through the output resistor 21 from the negative input terminal to the output terminal. The downstream current Ihd that flows in the downstream heating resistor 182 becomes larger than the upstream current Ihu that flows in the upstream heating resistor 181. The electric current Im is given by the equation (2). Because the relative temperature falling amount and the relative resistance value decreasing amount of the downstream heating resistor 182 increase as the flow rate in the backward flow direction X2 increases, the electric current Im decreases.

$$Ihu < Ihd$$

$$Im = Ihu - Ihd < 0 \quad (2)$$

The voltage Vm at the output terminal of the operational amplifier 23, i.e., the output signal Vm of the sensor unit 25 is given by the equation (3). In the equation (3), Rm is the resistance value of the output resistor 21. Accordingly, as represented in FIG. 5, the output signal Vm of the sensor unit 25 has such a characteristic as monotonically increasing in both the forward flow and the backward flow as the flow rate increases.

$$Vm = Vc/2 \times Im \quad (3)$$

Figure 5:
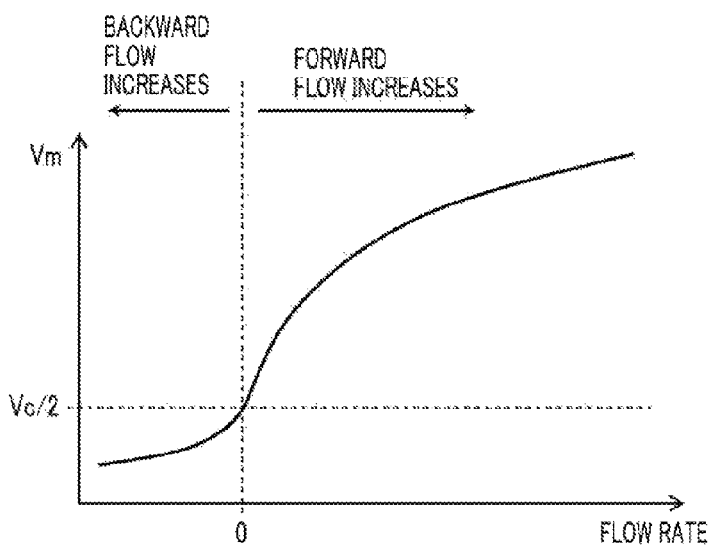
FIG. 5 is an output characteristic graph of the sensor unit according to Embodiment 1 of the present invention.

FIG. 5 represents the output characteristic of the sensor unit 25 according to Embodiment 1. The flow rate in the forward flow direction X1 is represented by a positive value; the flow rate in the backward flow direction X2 is represented by a negative value. That is to say, the flow rate increases from "0" as the flow rate in the forward flow direction X1 increases; the flow rate decreases from "0" as the flow rate in the backward flow direction X2 increases. The output characteristic of the sensor unit 25 is a monotonically increasing nonlinear characteristic. The output characteristic of the sensor unit 25 at the forward flow direction X1 side where the flow rate is larger than "0" is different from the output characteristic thereof at the backward flow direction X2 side where the flow rate is smaller than "0". Specifically, the output characteristic of the sensor unit 25 at the forward flow direction side is a characteristic in which the gradient of increase in the output signal Vm to increase in the flow rate decreases as the flow rate increases from "0". The output characteristic of the sensor unit 25 at the backward flow direction X2 side is a characteristic in which the gradient of decrease in the output signal Vm to decrease in the flow rate decreases as the flow rate decreases from "0". Due to, for example, the difference between the respective opening directions of the air inlet 31 and the air outlet 32 in the bypass flow path 29, the sensitivity of the output to the flow rate in the backward flow direction X2 is low in comparison with the sensitivity of the output to the flow rate in the forward flow direction X1, under the condition that the respective flow rates of the intake air flowing in the forward flow direction X1 and the intake air flowing in the backward flow direction X2 are equal to each other. In other words, the gradient of the output signal Vm to the flow rate in the backward flow direction X2 is smaller than gradient of the output signal Vm to the flow rate in the forward flow direction X1.

In the temperature change in each of the heating resistors 181 and 182 to the change in the flow rate, there occurs a response delay caused by, for example, the thermal capacity of the heating resistor. Accordingly, the output signal Vm of the sensor unit 25 delays in comparison with the real flow rate, When a pulsation flow occurs, the amplitude of the pulsation flow corresponding to the output signal Vm of the sensor unit 25 is reduced in comparison with the real amplitude of the pulsation flow.

Signal Processing Unit

The signal processing unit 3 processes the output signal Vm of the sensor unit 25 and then outputs the flow rate signal Vout. As represented in FIG. 4, the signal processing unit 3 includes a response correct on unit 7, a comparison signal output unit 8, an averaging processing unit 9, a coefficient multiplication processing unit 10, and a signal correction processing unit 11.

Figure 23:
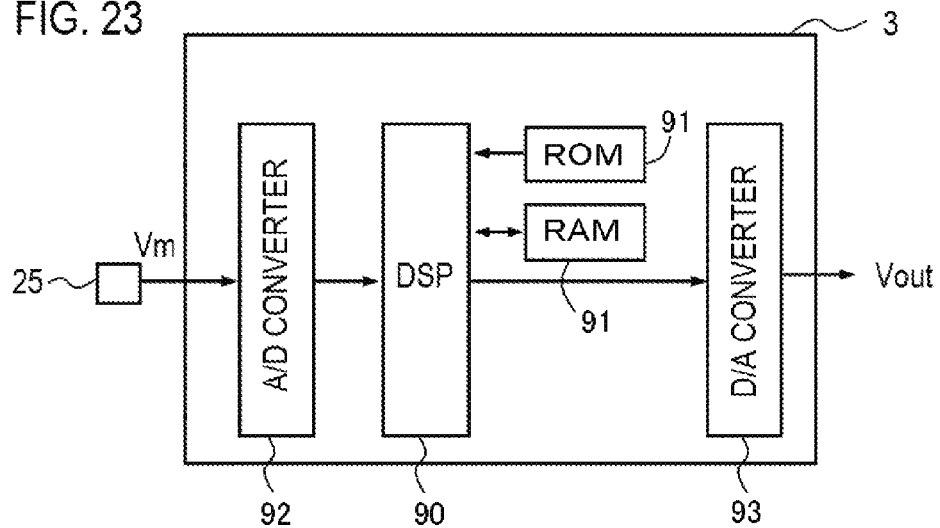
FIG. 23 is a schematic block diagram of a signal processing unit according to Embodiment 1 of the present invention.

The processing units 7 through 11 and the like are realized by respective processing circuits. In the present embodiment, the signal processing unit 3 is formed of a digital processing circuit. Specifically, as represented in FIG. 23, the signal processing unit 3 includes a computing processing unit (computer) 90 such as a DSP (Digital Signal Processor) and CPU (Central Processing Unit), a storage device 91 that exchanges data with the computing processing unit 90 such as a RAM (Random Access Memory) and a ROM (Read Only Memory), an A/D converter 92 (analogue-to-digital converter) that inputs the output signal Vm of the sensor unit 25 to the computing processing unit, a D/A converter 93 (digital-to-analogue converter) that outputs the flow rate signal Vout processed by the computing processing unit 90 to the outside thereof, and the like. The computing processing unit 90 implements programs stored in the storage device 91 and collaborates with the storage device 91, the A/D converter 92, and the D/A converter 93, so that the respective functions of the processing units 7 through 11 of the signal processing unit 3 are realized. Setting data pieces such as a comparison threshold value TH and the like utilized in the processing units 7 through 11 are stored, as part of programs, in the storage device 91.

Figure 6:
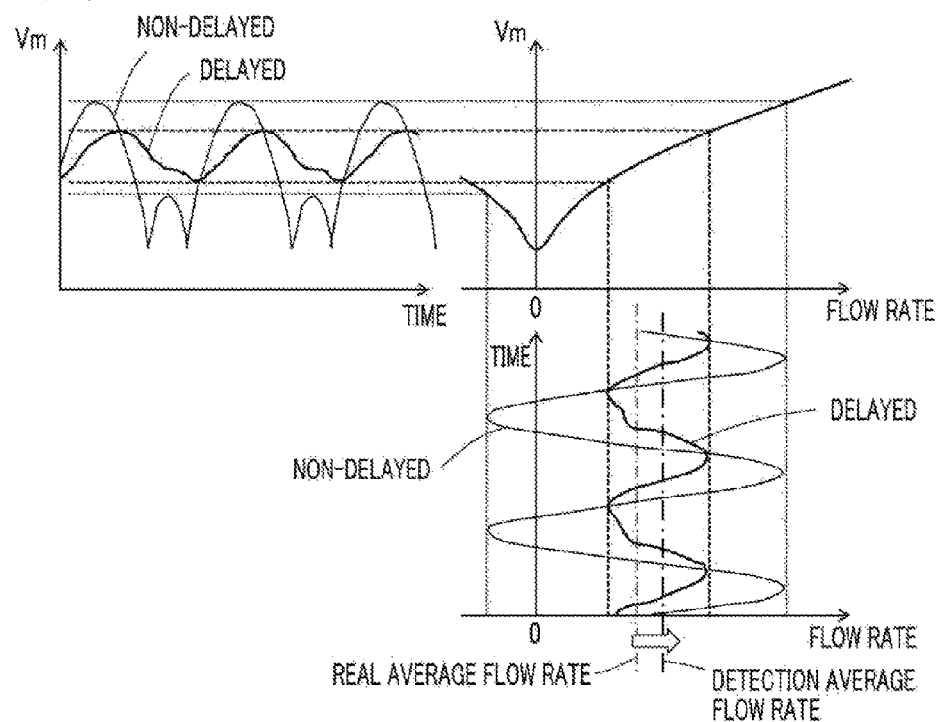
FIG. 6 is a set of charts for explaining a flow rate detection error related to a comparative example according to Embodiment 1 of the present invention.

There will be explained a mechanism in which a flow rate detection error occurs when a pulsation flow accompanied by a backward flow is caused. As represented in the right-top chart in FIG. 6, in the case of a sensor unit that relates to a comparative example different from the present embodiment and is incapable of detecting a backward flow, the output signal of the sensor unit in the backward flow occurrence region is larger than the no-air-flow output. Accordingly, when the output signal of the sensor is directly converted into the flow rate, there is produced a wave shape in which the wave shape at a time when a backward flow occurs looks like being folded back toward the forward flow side. The detection average flow rate per pulsation period, which is important in controlling an internal combustion engine, becomes larger than the real average flow rate; thus, a detection error (referred to a pulsation error, hereinafter) occurs.

Figure 7:
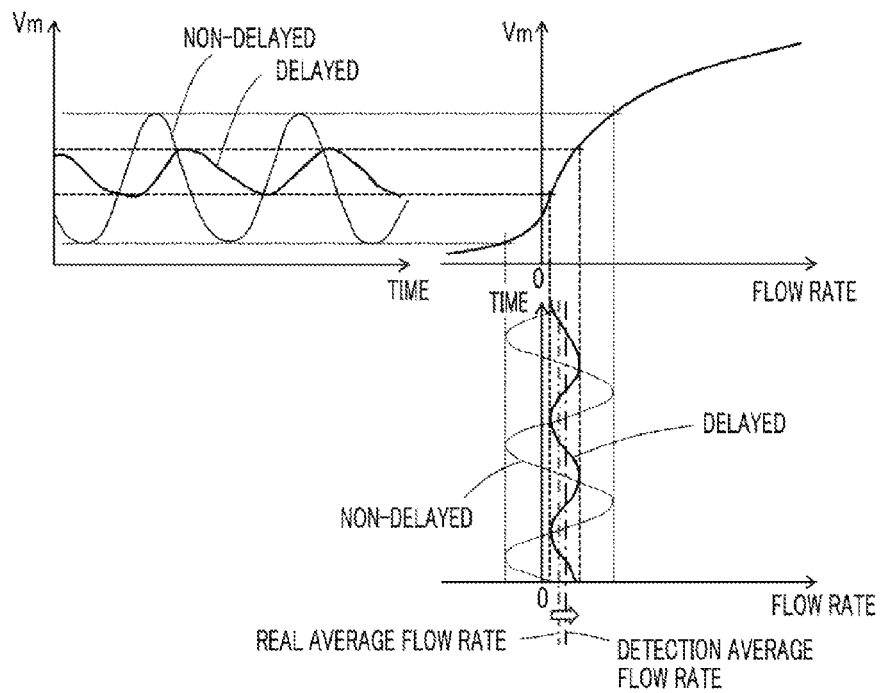
FIG. 7 is a set of charts for explaining a flow rate detection error related to the comparative example according to Embodiment 1 of the present invention.

As represented in FIG. 7, in the case of an comparative example in which even when as in the present embodiment, the sensor unit 25 capable of detecting a backward flow is utilized, processing different from that of the present embodiment is implemented, the foregoing nonlinear output characteristic of the sensor unit 25 and a response delay in the output signal Vm cause a pulsation error in which a detection average flow rate detected based on the output signal Vm of the sensor unit 25 shifts toward the positive side from the real average flow rate.

This is because as described above, the gradient of the output signal Vm to the flow rate decreases in the backward flow occurrence region as the backward flow rate increases and hence the sensitivity of the output signal Vm to the increase in the backward flow rate is lowered. In addition, the difference between the respective opening directions of the air inlet 31 and the air outlet 32 of the bypass flow path 29 causes the sensitivity of the output signal Vm to the backward flow rate to decrease. Accordingly, in the case where it is assumed that no response delay exists, the sensitivity of the output signal Vm to an increase in the backward flow rate decreases, and in the case where a response delay exists, the output signal Vm shifts toward the forward flow rate side (the positive side) where the sensitivity thereof is high. Thus, the detection average flow rate detected based on the output signal Vm having a response delay shifts toward the positive side from the real average flow rate.

Figure 8:
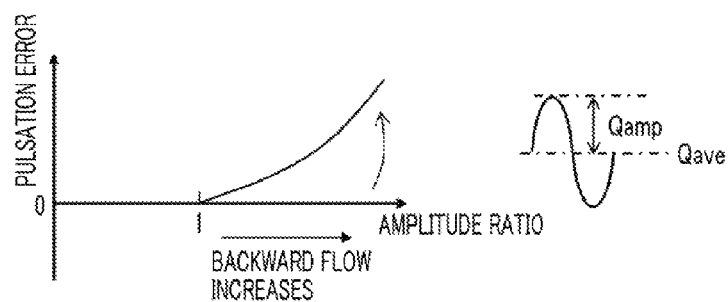
FIG. 8 is a set of charts for explaining a pulsation error related to the comparative example according to Embodiment 1 of the present invention.

With regard to this comparative example, letting the horizontal axis and the vertical axis denote the amplitude ratio and the pulsation error, respectively, the pulsation error in the backward flow occurrence region where the amplitude ratio is larger than "1" increases toward the positive side as the amplitude ratio increases from "1", as represented in FIG. 8. The amplitude ratio is the ratio of the amplitude Qamp of a pulsation flow to the average flow rate Qave of the pulsation flow (=Qamp/Qave); the pulsation error is the ratio of the detection average flow rate to the real average flow rate (=detection average flow rate/real average flow rate−1).

Accordingly, in the present embodiment, as explained later, in order to decrease the positive-side shifting amount of the detection average flow rate at a time when a pulsation flow accompanied by a backward flow occurs, a decrease correction for decreasing the flow rate signal Vout is performed. That is to say, the response correction unit 7 outputs an amplitude increase signal obtained by applying amplitude increase processing to the AC components of the output signal Vm of the sensor 25. The comparison signal output unit 8 compares the amplitude increase signal with the preliminarily set comparison threshold value TH and then outputs a negative-side comparison signal Vfc in accordance with the negative portion, of the amplitude increase signal, that is at the negative side of the comparison threshold value TH. The averaging processing unit 9 outputs an average signal Vfca obtained by averaging the comparison signal Vfc. The coefficent multiplication processing unit 10 outputs a coefficient multiplication signal Vfk obtained by multiplying the average signal Vfca by a preliminary set adjustment coefficient Kad. The signal correction processing unit 11 outputs, as the flow rate signal Vout, a value obtained by applying decrease correction to the amplitude increase signal by the coefficient multiplication signal Vfk.

Due to the response delay in the sensor unit 25, the amplitude of the AC components of the pulsation flow in the output signal Vm is reduced. The response correction unit 7 makes the amplitude of the AC components of the output signal Vm increase, so that the effect of the response delay in the sensor unit 25 can be reduced. However, the positive-side shift of the detection average flow rate cannot be eliminated by only applying the amplitude increase processing to the AC components. Thus, by outputting the negative-side comparison signal Vfc in accordance with the negative portion, of the amplitude increase signal, that is at the negative side of the comparison threshold value TH, the components corresponding to the backward flow rate can be extracted. By outputting the average signal Vfca obtained by averaging the comparison signal Vfc, a signal corresponding to the average value of the backward flow rate can be outputted. By outputting the coefficient multiplication signal Vfk obtained by multiplying the average signal Vfca by the adjustment coefficient Kad, a signal corresponding to the positive-side shifting amount, of the detection average flow rate, that is caused by a backward flow rate can be outputted. Then, by outputting, as the flow rate signal Vout, a value obtained by applying the coefficient multiplication signal Vfk to decrease correction of the amplitude increase signal, the positive-side shifting amount, of the detection average flow rate, that is caused by a backward flow rate can be reduced.

In the present embodiment, as represented in FIG. 4, the response correction unit 7 outputs a first amplitude increase signal Vf1 obtained by applying a first amplitude increase processing to the AC components of the output signal Vm of the sensor unit 25 and a second amplitude increase signal Vf2 obtained by applying a second amplitude increase processing to the AC components of the output signal Vm of the sensor unit 25. Then, the comparison signal output unit 8 compares the second amplitude increase signal Vf2 with the comparison threshold value TH and then outputs the negative-side comparison signal Vfc. The signal correction processing unit 11 outputs, as the flow rate signal Vout, a value obtained by applying decrease correction to the first amplitude increase signal Vf1 by the coefficient multiplication signal Vfk.

In this configuration, two amplitude increase processing are performed; therefore, the first amplitude increase processing suitable for outputting the first amplitude increase signal Vf1, which is the base signal of the flow rate signal Vout, can be implemented and the second amplitude increase processing suitable for decrease processing of the shifting amount can be implemented. In other words, amplitude increase processing suitable for each of the purposes of the response correction and the shift correction can be performed; thus, the accuracy of processing the flow rate signal Vout can be raised.

Figure 9:
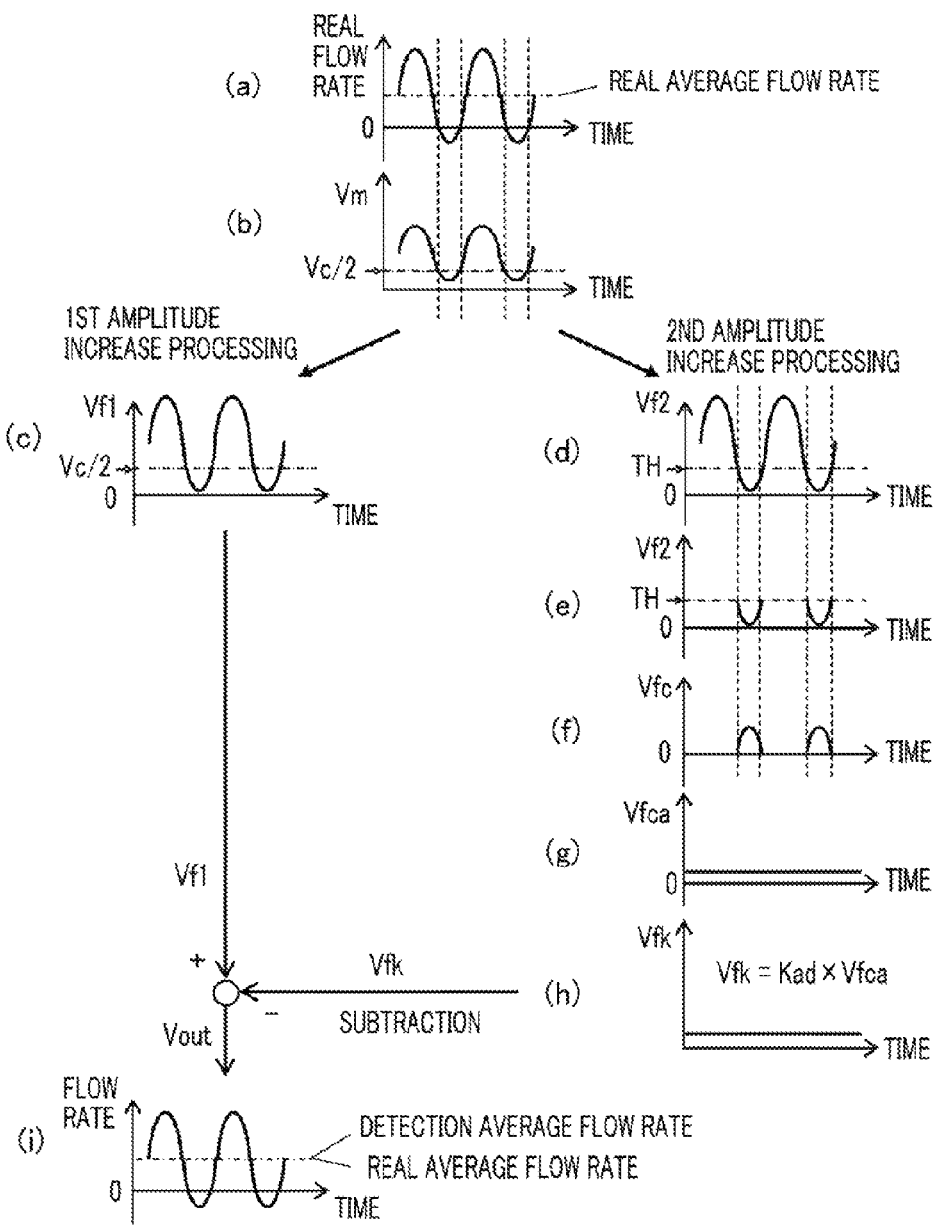
FIG. 9 is a set of charts for explaining the respective operational actions of units according to Embodiment 1 of the present invention.

FIG. 9 represents a set of operation waveforms according to the present embodiment. In the case where such a pulsation flow accompanied by a backward flow as represented in FIG. 9(a) occurs, the output signal Vm of the sensor unit 25, which has been A/D-converted, is shown in FIG. 9 (b). Due to a response delay, the amplitude of the AC components of the output signal Vm of the sensor unit 25 is reduced.

FIG. 9(c) represents the first amplitude increase signal Vf1, the AC-component amplitude of which is larger than that of the output signal Vm, due to the first amplitude increase processing by the response correction unit 7. FIG. 9 (d) represents the second amplitude increase signal Vf2, the AC-component amplitude of which is larger than that of the output signal Vm, due to the second amplitude increase processing by the response correction unit 7. As the amplitude increase processing, there is utilized response advancing processing or the like that has a characteristic opposite to the response delayed-response characteristic of the sensor unit 25. The setting constants for the response advancing processing are set to different values in accordance with the respective purposes of the first amplitude increase processing and the second amplitude increase processing.

In the present embodiment, as represented in FIGS. 9(d), 9(e), and 9(f) and in the equation (4), the comparison signal output unit 8 compares the second amplitude increase signal Vf2 with the comparison threshold value TH and then extracts the negative portion, of the second amplitude increase signal Vf2, that is at the negative side of the comparison threshold value TH. Then, in the case where a negative portion, of the second amplitude increase signal Vf2, that is at the negative side of the comparison threshold value TH exists, the comparison signal output unit 8 outputs, as the negative-side comparison signal Vfc, the absolute value of the negative portion of the second amplitude increase signal Vf2. In the case where no negative portion of the second amplitude increase signal Vf2 exists, the comparison signal output unit 8 outputs "0", as the negative-side comparison signal Vfc. The negative-side comparison signal Vfc increases as the backward flow rate increases.

1) In the case where Vf2<TH:

$$Vfc=|Vf2-TH|$$

2) in the case where Vf2≥TH $$Vfc=0 \qquad (4)$$

As represented in FIG. 9(g), the averaging processing unit 9 outputs the average signal Vfca obtained by averaging the comparison signal Vfc. The averaging processing is performed through moving-average processing, lowpass-filter processing, or the like. As represented in FIG. 9 (h) and in the equation (5), the coefficient multiplication processing unit 10 outputs, as the coefficient multiplication signal Vfk, a value obtained by multiplying the average signal Vfca by the adjustment coefficient Kad.

$$Vfk=Kad \times Vfc \qquad (5)$$

Figure 10:
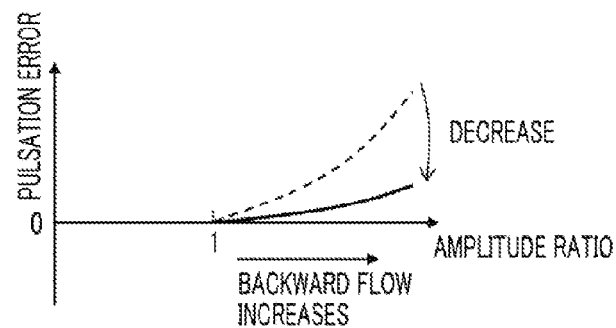
FIG. 10 is a graph for explaining reduction of a pulsation error according to Embodiment 1 of the present invention.

As represented in FIG. 9, the signal correction on processing unit 11 outputs, as the flow rate signal Vout, a value obtained by subtracting the coefficient multiplication signal Vfk, which is a positive value, from the first amplitude increase signal Vf1. It is made possible to make the detection average flow rate to be calculated from the flow rate signal Vout approach the real average flow rate. Because the coefficient multiplication signal Vfk increases as the backward flow rate increases, the positive-side shifting amount, which increases as the backward flow rate increases, can appropriately be reduced. As a result, as represented in FIG. 10, the pulsation error can be reduced in the backward flow occurrence region where the amplitude ratio is larger than "1".

2. Embodiment 2

In Embodiment 1, there has been explained a method of correcting a shift of the average flow rate at a time when a pulsation flow accompanied by a backward flow occurs. In Embodiment 2, there will be explained a method of correcting a shift of the average flow rate at a time when a pulsation flow unaccompanied by a backward flow occurs. The basic configurations of the sensor unit 25 and the signal processing unit 3 in the thermal-type airflow meter 1 according to Embodiment 2 are the same as those in Embodiment 1; however, the processing in each of the comparison signal output unit 8 and the signal correction processing unit 11 of the signal processing unit 3 is different from that in Embodiment 1. The explanation for constituent carts that are the same as those in Embodiment 1 will be omitted.

Figure 11:
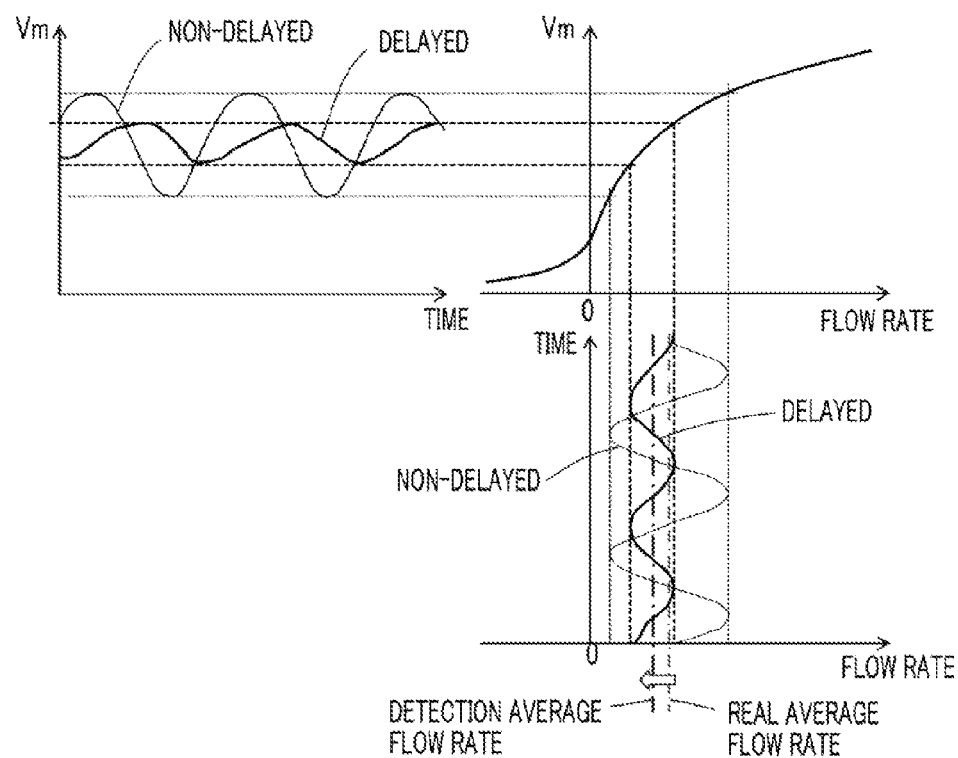
FIG. 11 is a set of charts for explaining a flow rate detection error related to a comparative example according to Embodiment 2 of the present invention.

At first, there will be explained a mechanism in which a flow rate detection error occurs when a pulsation flow unaccompanied by a backward flow is caused. As represented in FIG. 11, in the case of an comparative example in which even when as in the present embodiment, the sensor unit 25 capable of detecting a backward flow is utilized, processing different from that of the present embodiment is implemented, the foregoing nonlinear output characteristic of the sensor unit 25 and a response delay in the output signal Vm cause a pulsation error in which a detection average flow rate detected based on the output signal Vm of the sensor unit 25 shifts toward the negative side from the real average flow rate.

This is because as described above, the gradient of the output signal Vm to the flow rate decreases in the backward flow non-occurrence region as the forward flow rate increases and hence the sensitivity of the output signal Vm to the increase in the forward flow rate is lowered. Accordingly, in the case where it is assumed that no response delay exists, the sensitivity of the output signal Vm to an increase in the forward flow rate decreases, and in the case where it is assumed that a response delay exists, the output signal Vm shifts toward the negative side where the sensitivity thereof is high. Thus, the detection average flow rate detected based on the output signal Vm having a response delay shifts toward the negative side from the real average flow rate.

Figure 12:
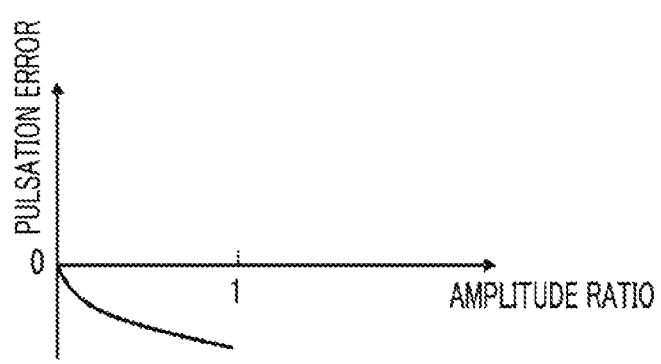
FIG. 12 is a graph for explaining a pulsation error related to the comparative example according to Embodiment 2 of the present invention.

With regard to this comparative example, letting the horizontal axis and the vertical axis denote the amplitude ratio and the pulsation error, respectively, the amplitude of the pulsation flow in the backward flow non-occurrence region where the amplitude ratio is smaller than "1" becomes larger than the average flow rate, and the pulsation error becomes larger toward the negative side as the amplitude ratio approaches to "1", as represented in FIG. 12.

Accordingly, in the present embodiment, as explained later, in order to decrease the negative-side shifting amount of the detection average flow rate at a time when a pulsation flow unaccompanied by a backward flow occurs, an increase correction for increasing the flow rate signal Vout is performed. That is to say, the response correction unit 7 outputs an amplitude increase signal obtained by applying amplitude increase processing to the AC components of the output signal Vm of the sensor 25. The comparison signal output unit 8 compares the amplitude increase signal with the preliminarily set comparison threshold value TH and then outputs a positive-side comparison signal Vfc in accordance with the positive portion, of the amplitude increase signal, that is at the positive side of the comparison threshold value TH. The averaging processing unit 9 outputs the average signal Vfca obtained by averaging the comparison signal Vfc. The coefficient multiplication processing unit 10 outputs the coefficient multiplication signal Vfk obtained by multiplying the average signal Vfca by the preliminarily set adjustment coefficient Kad. The signal correction processing unit 11 outputs, as the flow rate signal Vout, a value obtained by applying increase correction to the amplitude increase signal by the coefficient multiplication signal Vfk.

The response correction unit 7 makes the amplitude of the AC components of the output signal Vm increase, so that the effect of the response delay in the sensor unit 25 can be reduced. However, the negative-side shift of the detection average flow rate cannot be eliminated by only applying the amplitude increase processing to the AC components. Thus, by outputting the positive-side comparison signal Vfc in accordance with the positive portion, of the amplitude increase signal, that is at the positive side of the comparison threshold value TH, the components corresponding to the forward flow rate can be extracted. By outputting the average signal Vfca obtained by averaging the comparison signal Vfc, a signal corresponding to the average value of the forward flow rate can be outputted. By outputting the coefficient multiplication signal Vfk obtained by multiplying the average signal Vfca by the adjustment coefficient Kad, a signal corresponding to the negative side shifting amount, of the detection average flow rate, that is caused by a forward flow rate can be outputted. Then, by outputting, as the flow rate signal Vout, a value obtained by applying increase correction to the amplitude increase signal by the coefficient multiplication signal Vfk, the negative-side shifting amount, of the detection average flow rate, that is caused by a forward flow rate can be reduced.

Figure 13:
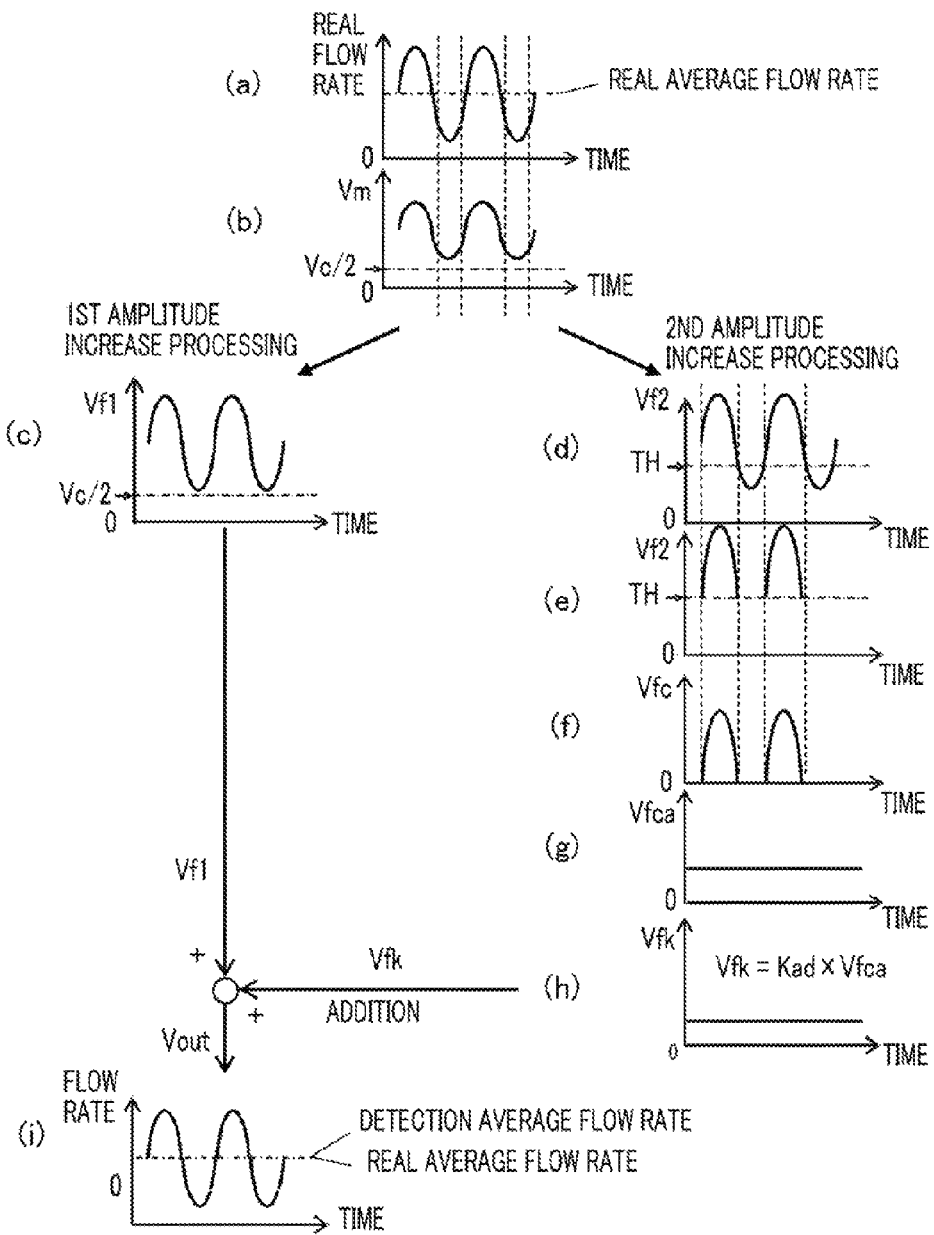
FIG. 13 is a set of charts for explaining the respective operational actions of units according to Embodiment 2 of the present invention.

FIG. 13 represents a set of operation waveforms according to the present embodiment. In the case where such a pulsation flow unaccompanied by a backward flow as represented in FIG. 13(a) occurs, the output signal Vm of the sensor unit 25, which has been A/D-converted, is shown in FIG. 13 (b). Due to a response delay, the amplitude of the AC components of the output signal Vm of the sensor unit 25 is reduced.

FIG. 13(c) represents the first amplitude increase signal Vf1, the AC-component amplitude of which is larger than that of the output signal Vm, due to the first amplitude increase processing by the response correction unit 7. FIG. 13 (d) represents the second amplitude increase signal Vf2, the AC-component amplitude of which is larger than that of the output signal Vm, due to the second amplitude increase processing by the response correction unit 7.

In the present embodiment, as represented in FIGS. 13(d), 13(e), and 13(f) and in the equation (6), the comparison signal output unit 8 compares the second amplitude increase signal Vf2 with the comparison threshold value TH and then extracts the positive portion, of the second amplitude increase signal Vf2, that is at the positive side of the comparison threshold value TH. Then, in the case where a positive portion, of the second amplitude increase signal Vf2, that is at the positive side of the comparison threshold value TH exists, the comparison signal output unit 8 outputs, as the positive-side comparison signal Vfc, the absolute value of the positive portion of the second amplitude increase signal Vf2. In the case where no positive portion of the second amplitude increase signal Vf2 exists, the comparison signal output unit 8 outputs "0", as the positive-side comparison signal Vfc. The positive-side comparison signal Vfc increases as the forward flow rate increases. The comparison threshold value TH is set to a value larger than the no-air-flow output Vc/2.

1) In the case where Vf2>TH:

$$Vfc=|Vf2-TH|$$

2) In the case where Vf2≤TH:

$$Vfc=0 \qquad (6)$$

As represented in FIG. 13(g), the averaging processing unit 9 outputs the average signal Vfca obtained by averaging the comparison signal Vfc. The averaging processing is performed through moving-average processing, lowpass-filter processing, or the like. As represented in FIG. 13 (h), the coefficient multiplication processing unit 10 outputs the coefficient multiplication signal Vfk obtained by multiplying the average signal Vfca by the adjustment coefficient Kad.

Figure 14:
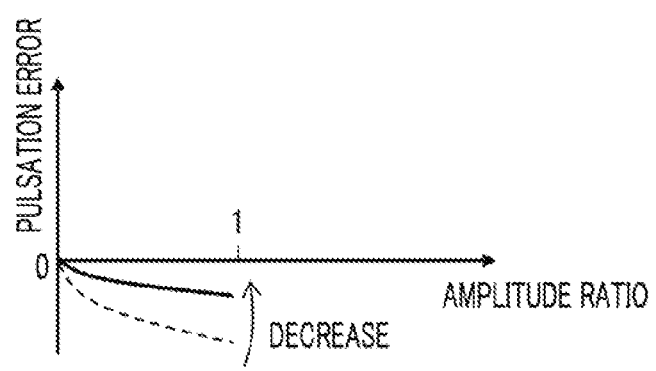
FIG. 14 is a graph for explaining reduction of a pulsation error according to Embodiment 2 of the present invention.

As represented in FIG. 13, the signal correction processing unit 11 outputs, as the flow rate signal Vout, a value obtained by adding the coefficient multiplication signal Vfk, which is a positive value, to the first amplitude increase signal Vf1. It is made possible to make the detection average flow rate to be calculated from the flow rate signal Vout approach the real average flow rate. Because the coefficient multiplication signal Vfk increases as the forward flow rate increases, the negative-side shifting amount, which increases as the forward flow rate increases, can appropriately be reduced. As a result, as represented in FIG. 14, the pulsation error can be reduced in the backward flow non-occurrence region where the amplitude ratio is smaller than "1".

3. Embodiment 3

In Embodiment 1, there has been explained a method of correcting a shift of the average flow rate at a time when a pulsation flow accompanied by a backward flow occurs; in Embodiment 2, there has been explained a method of correcting a shift of the average flow rate at a time when a pulsation flow unaccompanied by a backward flow occurs. In Embodiment 3, there will be explained a method, of correcting a shift of the average flow rate, that can deal with both the case where a pulsation flow accompanied by a backward flow occurs and the case where a pulsation flow unaccompanied by a backward flow occurs. The basic configurations of the sensor unit 25 and the signal processing unit 3 in the thermal-type airflow meter 1 according to Embodiment 3 are the same as those in each of Embodiments 1 and 2; however, the processing in each of the comparison signal output unit 8, the averaging processing unit 9, the coefficient multiplication processing unit 10, and the signal correction processing unit 11 of the signal processing unit 3 is different from that in each of Embodiments 1 and 2. The explanation for constituent parts that are the same as those in each of Embodiments 1 and 2 will be omitted.

Figure 15:
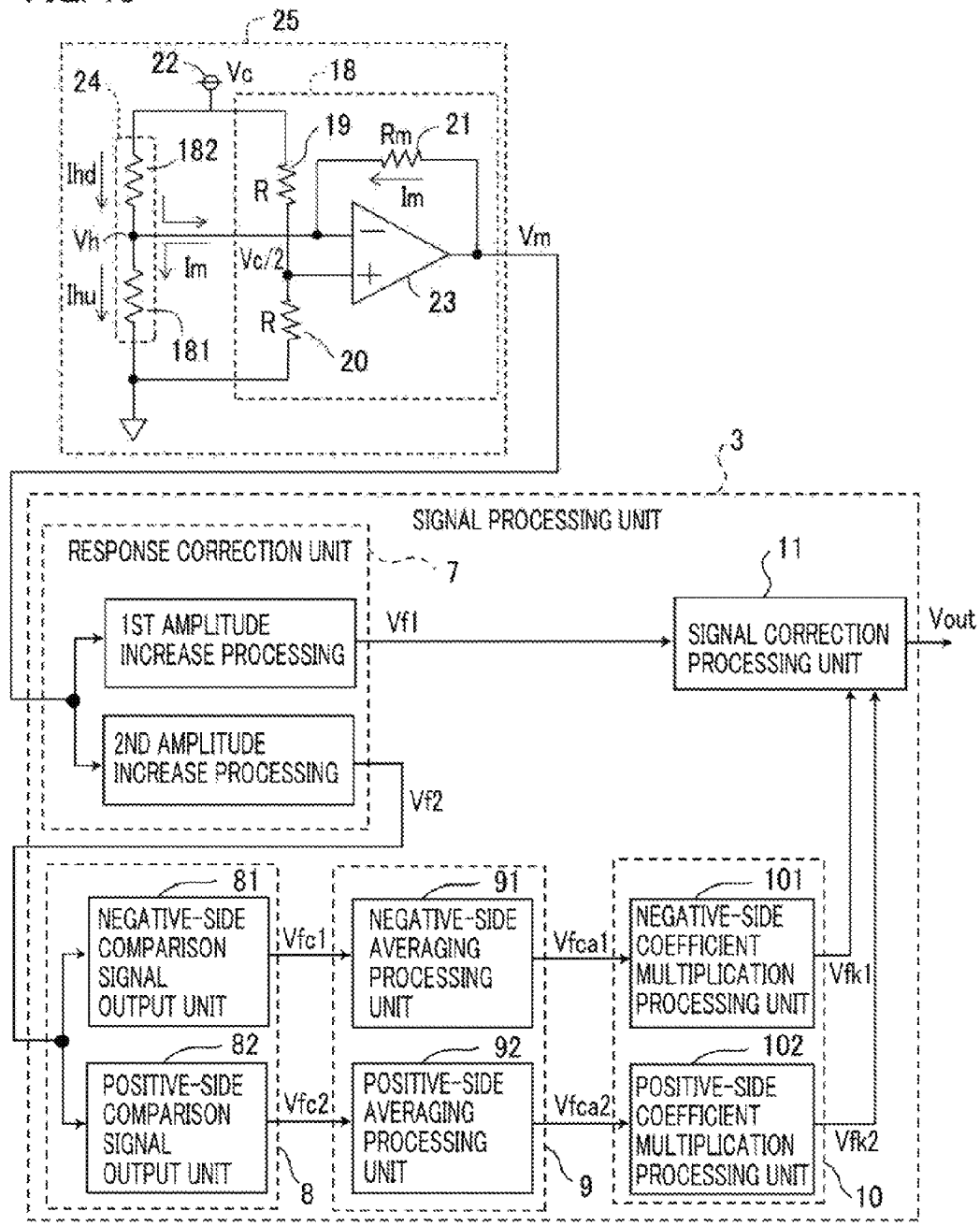
FIG. 15 is a circuit diagram of a sensor unit and a block diagram of a signal processing unit according to Embodiment 3 of the present invention.

FIG. 15 is a set of the circuit diagram of the sensor unit 25 and a block diagram of a signal processing unit 3 according to Embodiment. In Embodiment 3, the comparison signal output unit 8 compares the amplitude increase signal with the preliminarily set comparison threshold value TH and then outputs both a negative-side comparison signal Vfc1 in accordance with the negative portion, of the amplitude increase signal, that is at the negative side of the comparison threshold value TH and a positive-side comparison signal Vfc2 in accordance with the positive portion, of the amplitude increase signal, that is at the positive side of the comparison threshold value TH.

The comparison signal output unit 8 is provided with a negative-side comparison signal output unit 81 that applies processing, similar to that performed by the comparison signal output unit 8 in Embodiment 1, to the second amplitude increase signal Vf2 so as to output the negative-side comparison signal Vfc1 and a positive-side comparison signal output unit 82 that applies processing, similar to that performed by the comparison signal output unit 8 in Embodiment 2, to the second amplitude increase signal Vf2 so as to output the positive-side comparison signal Vfc2. In this situation, it may be allowed that the comparison threshold value TH in the negative-side comparison signal output unit 81 and the comparison threshold value TH in the positive-side comparison signal output unit 82 are set to respective values different from each other.

The averaging processing unit 9 is provided with a negative-side averaging processing unit 91 that, as is the case with Embodiment 1, outputs the negative-side average signal Vfca1 obtained by averaging the negative-side comparison signal Vfc1 and a positive-side averaging processing unit 92 that, as is the case with Embodiment 2, outputs the positive-side average signal Vfca2 obtained by averaging the positive-side comparison signal Vfc2.

The coefficient multiplication processing unit 10 is provided with a negative-side coefficient multiplication processing unit 101 that, as is the case with Embodiment 1, outputs a negative-side coefficient multiplication signal Vfk1 obtained by multiplying the negative-side average signal Vfca1 by a preliminarily set negative-side adjustment coefficient Kad1 and a positive-side coefficient multiplication processing unit 102 that, as is the case with Embodiment 2, outputs a positive-side coefficient multiplication signal Vfk2 obtained by multiplying the positive-side average signal Vfca2 by a preliminarily set positive-side adjustment coefficient Kad2. In this situation, it may be allowed that the negative-side adjustment coefficient Kad1 and the positive-side adjustment coefficient. Kad2 are set to respective values different from each other.

Then, when determining based on the output signal Vm of the sensor unit 25 that a flow in the backward flow direction X2 exists, the signal correction processing unit 11 outputs, as the flow rate signal Vout, a value obtained by applying decrease correction to the first amplitude increase signal Vf1 by the negative-side coefficient multiplication signal Vfk1 processed using the negative-side comparison signal Vfc1. In contrast, when determining based on the output signal Vm of the sensor unit 25 that no flow in the backward flow direction X2 exists, the signal correction processing unit 11 outputs, as the flow rate signal Vout, a value obtained by applying increase correction to the first amplitude increase signal Vf1 by the positive-side coefficient multiplication signal Vfk2 processed using the positive-side comparison signal Vfc2.

This configuration makes it possible that in the case where a pulsation flow accompanied by a backward flow occurs, the positive-side shifting amount of the detection average flow rate is reduced and that in the case where a pulsation flow unaccompanied by a backward flow occurs, the negative-side shifting amount of the detection average flow rate is reduced. As a result, as represented in FIG. 16, the pulsation error can be reduced in both the backward flow occurrence region where the amplitude ratio is larger than "1" and the backward flow non-occurrence region where the amplitude ratio is smaller than "1".

The absolute value of the negative-side coefficient multiplication signal Vfk1 increases as the backward flow rate rises. In the case where the absolute value of the negative-side coefficient multiplication signal Vfk1 is large, it can be determined that a flow accompanied by a backward flow has occurred; in the case where the absolute value of the negative-side coefficient multiplication signal Vfk1 is small, it can be determined that a flow accompanied by a backward flow has not occurred.

Accordingly, in Embodiment 3, as represented in the upper row in FIG. 17, in the case where the absolute value of the negative-side coefficient multiplication signal Vfk1 is larger than a preliminarily set increase/decrease determination threshold value THID, the signal correction processing unit 11 outputs, as the flow rate signal Vout, a value obtained by applying decrease correction to the first amplitude increase signal Vf1 by the negative-side coefficient multiplication signal Vfk1. In contrast, as represented in the lower row in FIG. 17, in the case where the absolute value of the negative-side coefficient multiplication signal Vfk1 is smaller than the increase/decrease determination threshold value THID, the signal correction processing unit 11 outputs, as the flow rate signal Vout, a value obtained by applying increase correction to the first amplitude increase signal Vf1 by the positive-side coefficient multiplication signal Vfk2.

The negative-side coefficient multiplication signal Vfk1 is a signal that is processed for the purpose of reducing the amount of positive-side shifting, of the average flow rate, that is caused by the occurrence of a pulsation flow accompanied by a backward flow; the negative-side coefficient multiplication signal Vfk1 is insusceptible to a pulsation error caused by a backward flow. Therefore, based on the negative-side coefficient multiplication signal Vfk1, it can accurately be determined whether or not a backward flow exists.

4. Embodiment 4

In Embodiment 1, there has been explained a case where the comparison signal output unit 8 extracts, as the negative-side comparison signal Vfc, the negative portion, of the amplitude increase signal, that is at the negative side of the comparison threshold value TH. The basic configurations of the sensor unit 25 and the signal processing unit 3 in the thermal-type airflow meter 1 according to Embodiment 4 are the same as those in Embodiment 1; however, the processing in the comparison signal output unit 8 of the signal processing unit 3 is different from that in Embodiment 1. In other words, in Embodiment 4, the comparison signal output unit 8 outputs, as the negative-side comparison signal Vfc, a rectangular wave in accordance with the negative portion, of the amplitude increase signal, that is at the negative side of the comparison threshold value TH. The explanation for constituent parts that are the same as those in Embodiment 1 will be omitted.

Figure 18:
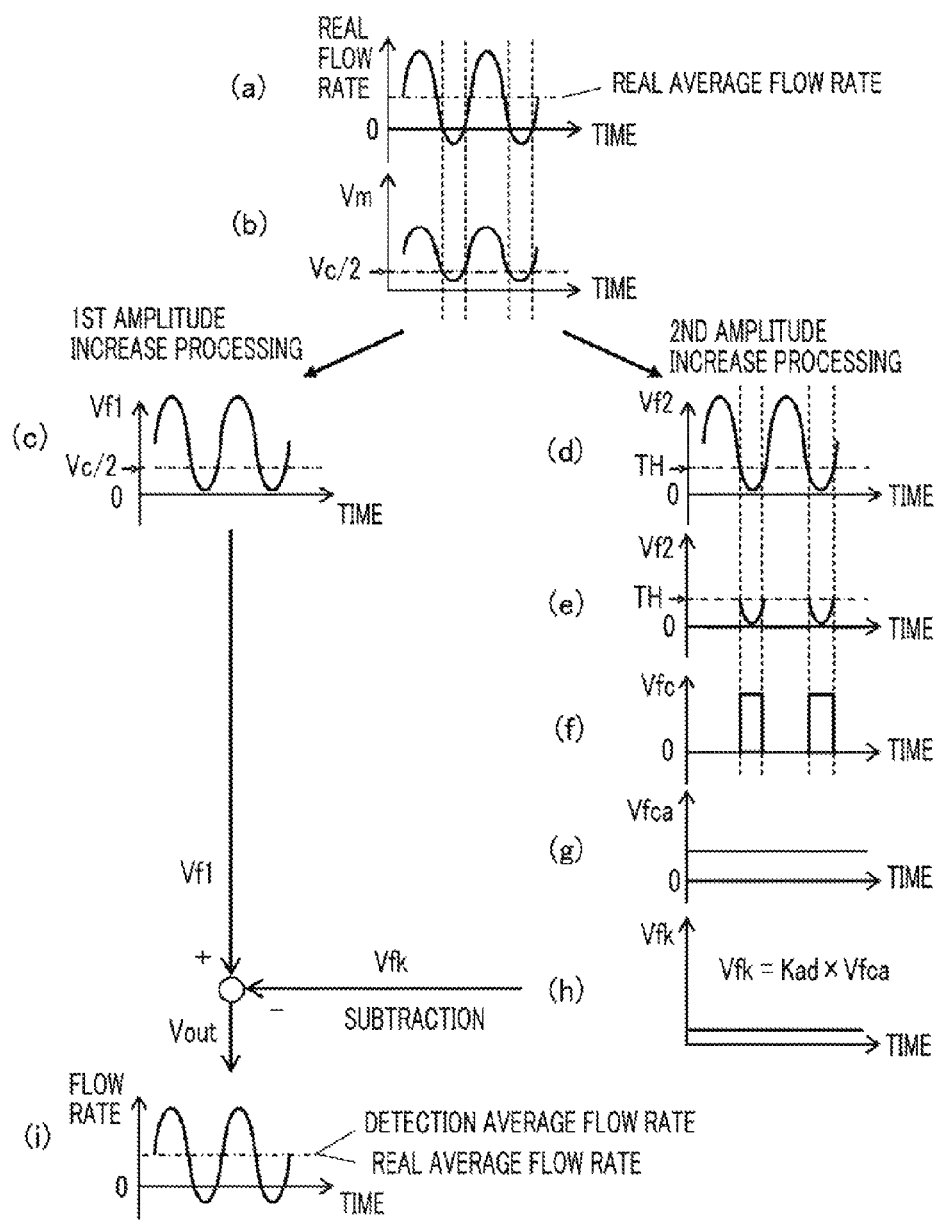
FIG. 18 is a set of charts for explaining the respective operational actions of units according to Embodiment 4 of the present invention.

FIG. 18 represents a set of operation waveforms according to the present embodiment. Because FIGS. 18(a) through 18(e) are the same as FIGS. 9(a) through 9(e), respectively, in Embodiment 1, the explanations therefor will be omitted.

In the present embodiment, as represented in FIGS. 18(d), 18(e), and 18(f) and in the equation (7), the comparison signal output unit 8 compares the second amplitude increase signal Vf2 with the comparison threshold value TH; in the case where a negative portion, of the second amplitude increase signal Vf2, that is at the negative side of the comparison threshold value TH exists, the comparison signal output unit 8 outputs, as the negative-side comparison signal Vfc, a wave height value Vcn that is preliminarily set to a positive value; in the case where no negative portion of the second amplitude increase signal Vf2 exists, the comparison signal output unit 8 outputs "0", as the negative-side comparison signal Vfc.

1) In the case where Vf2<TH:

$$Vfc=Vcn$$

2) In the case where Vf2≥TH:

$$Vfc=0 \quad (7)$$

As represented in FIG. 18(g), the averaging processing unit 9 outputs the average signal Vfca obtained by averaging the comparison signal Vfc, which is a rectangular wave. As represented in FIG. 18(h) the coefficient multiplication processing unit 10 outputs the coefficient multiplication signal Vfk obtained by multiplying the average signal Vfca by the adjustment coefficient Kad. Then, as represented in FIG. 18, the signal correction processing unit 11 outputs, as the flow rate signal Vout, a value obtained by subtracting the coefficient multiplication signal Vfk, which is a positive value, from the first amplitude increase signal Vf1.

By making the comparison signal Vfc to be a rectangular wave, it can be suppressed that due to a turbulence in the second amplitude increase signal Vf2 caused by the effect of a disturbance such as noise, the coefficient multiplication signal Vfk fluctuates, and hence it can be suppressed that the correction accuracy is deteriorated.

5. Embodiment 5

In Embodiment 2, there has been explained a case where the comparison signal output unit 8 extracts, as the positive-side comparison signal Vfc, the positive portion, of the amplitude increase signal, that is at the positive side of the comparison threshold value TH. The basic configurations of the sensor unit 25 and the signal processing unit 3 in the thermal-type airflow meter 1 according to Embodiment 5 are the same as those in Embodiment 2; however, the processing in the comparison signal output unit 8 of the signal processing unit 3 is different from that in Embodiment 2. In other words, in Embodiment 5, the comparison signal output unit 8 outputs, as the positive-side comparison signal Vfc, a rectangular wave in accordance with the positive portion, of the amplitude increase signal, that is at the positive side of the comparison threshold value TH. The explanation for constituent parts that are the same as those in Embodiment 2 will be omitted.

Figure 19:
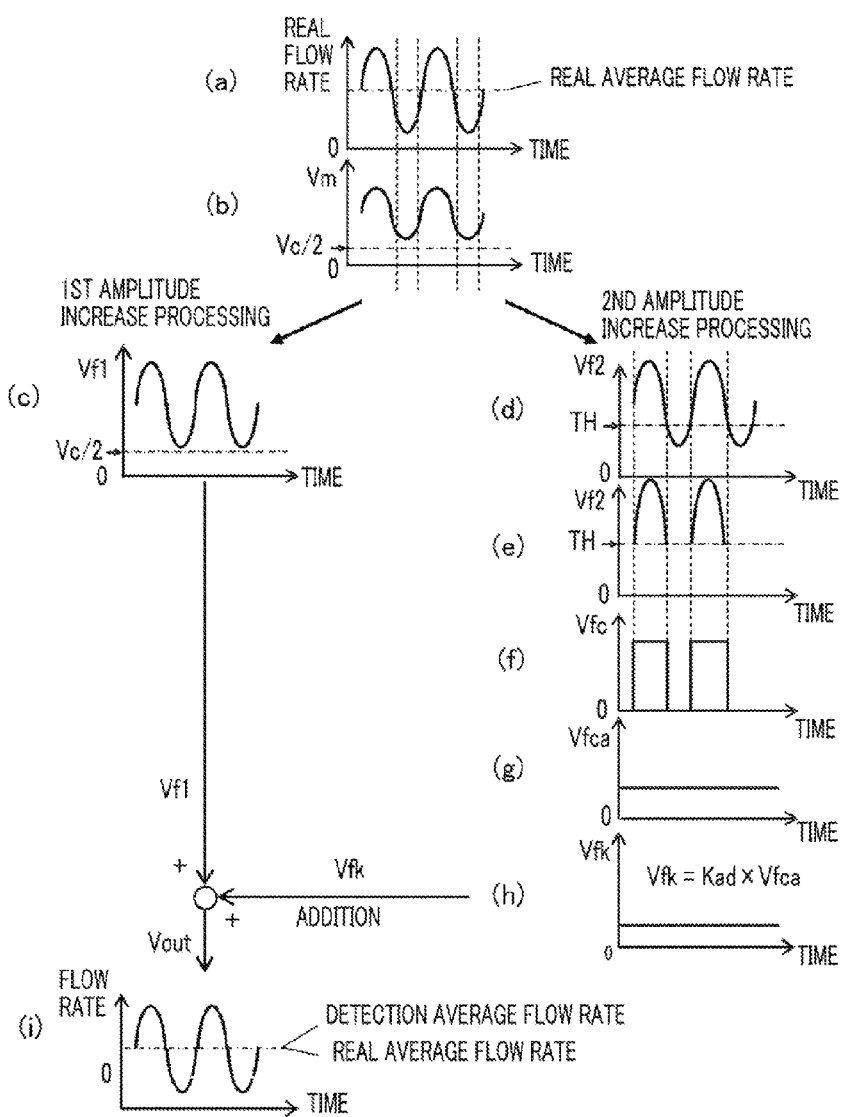
FIG. 19 is a set of charts for explaining the respective operational actions of units according to Embodiment 5 of the present invention.

FIG. 19 represents a set of operation waveforms according to the present embodiment. Because FIGS. 19(a) through 19(e) are the same as FIGS. 13(a) through 13(e), respectively, in Embodiment 2, the explanations therefor will be omitted.

In the present embodiment, as represented in FIGS. 19(d), 19(e) and 19(f) and in the equation (8), the comparison signal output unit compares the second amplitude increase signal Vf2 with the comparison threshold value TH; in the case where a positive portion, of the second amplitude increase signal Vf2, that is at the positive side of the comparison threshold value TH exists, the comparison signal output unit 8 outputs, as the positive-side comparison signal Vfc, a wave height value Vcn that is preliminarily set to a positive value; in the case where no positive portion of the second amplitude increase signal Vf2 exists, the comparison signal output unit 8 outputs "0", as the positive-side comparison signal Vfc.

1) In the case where Vf2>TH:

$$Vfc=Vcn$$

2) In the case where Vf2≥TH:

$$Vfc=0 \quad (8)$$

As represented in FIG. 19(g), the averaging processing unit 9 outputs the average signal Vfca obtained by averaging the comparison signal Vfc, which is a rectangular wave. As represented in FIG. 19(h), the coefficient multiplication processing unit 10 outputs the coefficient multiplication signal Vfk obtained by multiplying the average signal Vfca by the adjustment coefficient Kad. Then, as represented in FIG. 19, the signal correction processing unit 11 outputs, as the flow rate signal Vout, a value obtained by adding the coefficient multiplication signal Vfk, which is a positive value, to the first amplitude increase signal Vf1.

By making the comparison signal Vfc to be a rectangular wave, it can be suppressed that due to a turbulence in the second amplitude increase signal Vf2 caused by the effect of a disturbance such as noise, the coefficient multiplication signal Vfk fluctuates, and hence it can be suppressed that the correction accuracy is deteriorated.

6. Embodiment 6

In each of Embodiments 1 through 5, there has been explained a case where the comparison threshold value TH is a preliminary set fixed value. The basic configurations of the sensor unit 25 and the signal processing unit 3 in the thermal-type airflow meter 1 according to Embodiment 6 are the same as those in each of Embodiments 1 through 5; however, the method of setting the comparison threshold value TH is different from that in each of Embodiments 1 through 5. That is to say, in Embodiment 6, the comparison signal output unit 8 changes the comparison threshold value TH in accordance with an average output signal Vma obtained by averaging the output signal Vm of the sensor unit 25. The explanation for constituent parts that are the same as those in each of Embodiments 1 and 5 will be omitted.

Figure 20:
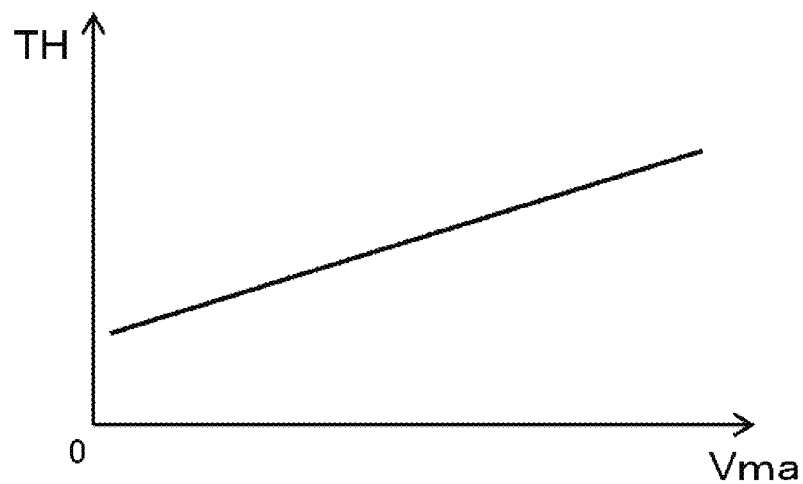
FIG. 20 is a graph for explaining setting of a comparison threshold value corresponding to an average output signal according to Embodiment 6 of the present invention.

The comparison signal output unit 8 outputs the average output signal Vma obtained by averaging the output signal Vm of the sensor unit 25 through moving-average processing, lowpass-filter processing, or the like. As represented, for example, in the equation (9) and in FIG. 20, the comparison signal output unit 8 sets the comparison threshold value TH to a value obtained by adding a preliminarily set offset value Bth to a value obtained by multiplying the average output signal Vma by a preliminarily set proportional gain Ath.

$$TH = Ath \times Vma + Bth \qquad (9)$$

Alternatively, it may be allowed that by use of a map in which the relationship between the average output signal Vma and the comparison threshold value TH is preliminarily set, a quadratic or higher-degree polynomial, or the like, the comparison signal output unit 8 sets the comparison threshold value TH, based on the average output signal Vma.

By providing, in such a manner as described above, flow-rate dependence to the setting of the comparison threshold value TH, it is made possible to provide flow-rate dependence to the coefficient multiplication signal Vfk for correcting the first amplitude increase signal Vf1; thus, a more accurate pulsation-error correction in accordance with a change in the amplitude ratio can be performed.

7. Embodiment 7

In each of Embodiments 1 through 6, there has been explained a case where the adjustment coefficient Kad is a preliminarily set fixed value. The basic configurations of the sensor unit 25 and the signal processing unit 3 in the thermal-type airflow meter 1 according to Embodiment 7 are the same as those in each of Embodiments 1 through 6; however, the method of setting the adjustment coefficient Kad is different from that in each of Embodiments 1 through 6. That is to say, in Embodiment 7, the coefficient multiplication processing unit 10 changes the adjustment coefficient Kad in accordance with an average output signal Vma obtained by averaging the output signal Vm of the sensor unit 25. The explanation for constituent parts that are the same as those in each of Embodiments 1 and 6 will be omitted.

Figure 21:
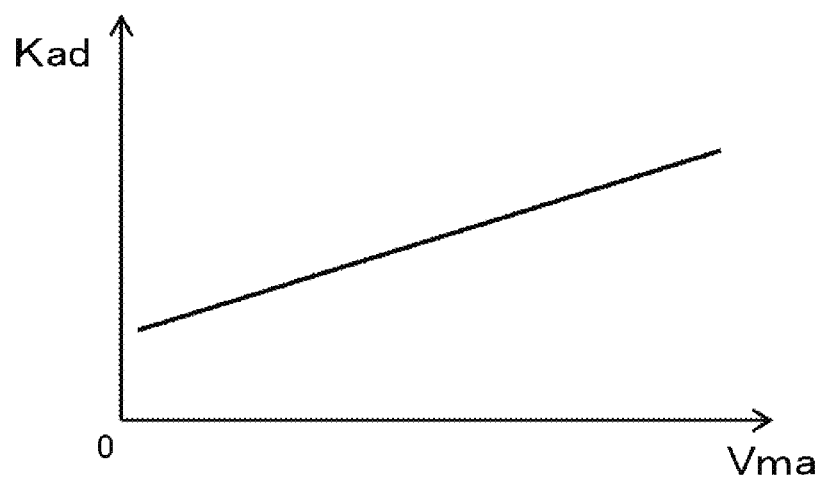
FIG. 21 is a graph for explaining setting of an adjustment coefficient corresponding to an average output signal according to Embodiment 7 of the present invention.

The coefficient multiplication processing unit 10 outputs the average output signal Vma obtained by averaging the output signal Vm of the sensor unit 25 through moving-average processing, lowpass-filter processing, or the like. As represented, for example, in the equation (10) and in FIG. 21, the coefficient multiplication processing unit 10 sets the adjustment coefficient Kad to a value obtained by adding a preliminarily set offset value Bk to a value obtained by multiplying the average output signal Vma by preliminarily set proportional gain Ak.

$$Kad = Ak \times Vma - Bk \qquad (10)$$

Alternatively, it may be allowed that by use of a map in which the relationship between the average output signal Vma and the adjustment coefficient Kad is preliminarily set, a quadratic or higher-degree polynomial, or the like, the coefficient multiplication processing unit 10 sets the adjustment coefficient Kad, based on the average output signal Vma.

By providing, in such a manner as described above, flow-rate dependence to the setting of the adjustment coefficient Kad, it is made possible to provide flow-rate dependence to the coefficient multiplication signal Vfk for correcting the first amplitude increase signal Vf1; thus, a more accurate pulsation-error correction in accordance with a change in the amplitude ratio can be performed.

8. Embodiment 8

In Embodiment 6, there has been explained a case where the comparison threshold value TH is changed in accordance with the average output signal Vma; in Embodiment 7, there has been explained a case where the adjustment coefficient Kad is changed in accordance with the average output signal Vma. In the present embodiment, the comparison signal output unit 8 changes the comparison threshold value TH in accordance with the average output signal Vma, and the coefficient multiplication processing unit 10 changes the adjustment coefficient Kad in accordance with the average output signal Vma. Because the configuration of each of the comparison signal output unit 8 and the coefficient multiplication processing unit 10 is the same as the configuration of each of Embodiments 6 and 7, respectively, the explanations therefor will be omitted. In comparison with each of Embodiments 6 and 7, this configuration makes it possible to perform a more accurate pulsation-error correction in accordance with a change in the pulsation condition.

9. Embodiment 9

In each of Embodiments 4 and 5, there has been explained a case where the wave height value Vcn of a rectangular wave as the negative-side or positive-side comparison signal Vfc is set to a preliminarily set fixed value. In Embodiment 9, the comparison signal output unit 8 changes the wave height value Vcn of a rectangular wave, as the negative-side or positive-side comparison signal Vfc, in accordance with the average output signal Vma obtained by averaging the output signal Vm of the sensor unit 25. The explanation for constituent parts that are the same as those in each of Embodiments 4 and 5 will be omitted.

Figure 22:
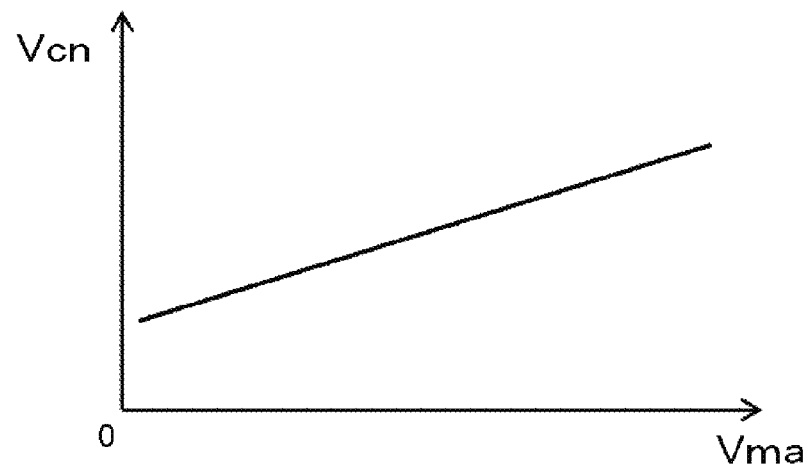
FIG. 22 is a graph for explaining setting of the wave height value of a rectangular wave corresponding to an average output signal according to Embodiment 9 of the present invention.

The comparison signal output unit 8 outputs the average output signal Vma obtained by averaging the output signal Vm of the sensor unit 25 through moving-average processing, lowpass-filter processing, or the like. As represented, for example, in the equation (11) and in FIG. 22, the comparison signal output unit 8 sets the wave height value Vcn to a value obtained by adding a preliminarily set offset value Bv to a value obtained by multiplying the average output signal Vma by a preliminarily set proportional gain Av.

$$Vcn = Av \times Vma + Bv \qquad (11)$$

Alternatively, it may be allowed that by use of a map in which the relationship between the average output signal Vma and the wave height value Vcn is preliminarily set, a quadratic or higher-degree polynomial, or the like, the comparison signal output unit 8 sets the wave height value Vcn, based on the average output signal Vma.

In the case where as the comparison signal output unit 8, a comparator is utilized, it may be allowed that as represented in the equation (12), a positive-side power-source voltage Vp to be supplied to the comparator is changed in accordance with the average output signal Vma so that the wave height value Vcn of a rectangular wave outputted from the comparator changes in accordance with the average output signal Vma.

$$Vp = Ap \times Vma - Bp \quad (12)$$

By, as described above, providing flow-rate dependence to the setting of the wave height value Vcn, it is made possible that even when a rectangular wave is utilized, the flow-rate dependence of the coefficient multiplication signal Vfk is raised; thus, a more accurate pulsation-error correction in accordance with a change in the amplitude ratio can be performed.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In each of the foregoing embodiments, there has been explained, as an example, a case where the signal processing unit 3 is formed of a digital processing circuit. However, embodiments of the present invention are not limited to the foregoing case. In other words, the signal processing unit 3 may be formed of an analogue processing circuit including an operational amplifier, a comparator, resistors, capacitors, and the like.

(2) In the foregoing embodiment 1, there has been explained, as an example, a case where the signal processing unit 3 outputs, as the negative-side comparison signal Vfc, the absolute value of the negative portion of the second amplitude increase signal Vf2, and then outputs, as the flow rate signal Vout, a value obtained by subtracting the coefficient multiplication signal Vfk, which is a positive value processed based on the negative-side comparison signal Vfc, from the first amplitude increase signal Vf1. However, embodiments of the present invention are not limited to the foregoing case. That is to say, the signal correction processing unit 11 may be configured in an arbitrary manner, as long as it outputs, as the flow rate signal Vout, a value obtained by applying decrease correction to the first amplitude increase signal Vf1 by the coefficient multiplication signal Vfk. For example, it may be allowed that the comparison signal output unit 8 directly outputs, as the negative-side comparison signal Vfc, the negative portion of the second amplitude increase signal Vf2, which is a negative value, and then outputs, as the flow rate signal Vout, a value obtained by adding the coefficient multiplication signal Vfk, which is a negative value processed based on the negative-side comparison signal Vfc, to the first amplitude increase signal Vf1 so that decrease correction for decreasing the first amplitude increase signal Vf1 is performed.

(3) In each of the foregoing embodiments, there has been explained, as an example, a case in which the response correction unit 7 outputs the first amplitude increase signal Vf1 obtained by applying the first amplitude increase processing to the AC components of the output signal Vm of the sensor unit 25 and the second amplitude increase signal Vf2 obtained by applying the second amplitude increase processing to the AC components of the output signal Vm of the sensor unit 25, in which the comparison signal output unit 8 compares the second amplitude increase signal Vf2 with the comparison threshold value TH and then outputs both or one of the negative-side comparison signal Vfc and the positive-side comparison signal Vfc, and in which the signal correction processing unit 11 outputs, as the flow rate signal Vout, a value obtained by applying the coefficient multiplication signal Vfk to decrease correction or increase correction of the first amplitude increase signal Vf1. However, embodiments of the present invention are not limited to the foregoing case. In other words, it may be allowed that the response correction unit 7 outputs a single amplitude increase signal, that the comparison signal output unit 8 compares a single amplitude increase signal with the comparison threshold value TH and then outputs both or one of the negative-side comparison signal Vfc and the positive-side comparison signal Vfc, and that the signal correction processing unit 11 outputs, as the flow rate signal Vout, a value obtained by applying the coefficient multiplication signal Vfk to decrease correction or increase correction of a single amplitude increase signal.

(4) In each of the foregoing embodiments, there has been explained, as an example, a case in which when the absolute value of the negative-side coefficient multiplication signal Vfk1 is larger than the increase/decrease determination threshold value THID, the signal correction processing unit 11 determines that a flow in the backward flow direction X2 has occurred and in which when the absolute value of the negative-side coefficient multiplication signal Vfk1 is smaller than the increase/decrease determination threshold value THID, the signal correction processing unit 11 determines that no flow in the backward flow direction X2 has occurred. However, embodiments of the present invention are not limited to the foregoing case. In other words, the signal correction processing unit 11 may utilize any arbitrary determination method, as long as it determines based on the output signal Vm of the sensor unit 25 whether or not a flow in the backward flow direction X2 has occurred. For example, it may be allowed that when the first amplitude increase signal Vf1 is smaller than the no-air-flow output Vc/2, the signal correction processing unit 11 determines that a flow in the backward flow direction X2 has occurred and that when the first amplitude increase signal Vf1 is not smaller than the no-air-flow output Vc/2, the signal correction processing unit 11 determines that no flow in the backward flow direction X2 has occurred. Alternatively, it may be allowed that when a value obtained by applying the negative-side coefficient multiplication signal Vfk1 to decrease correction of the first amplitude increase signal Vf1 is smaller than the no-air-flow output Vc/2, the signal correction processing unit 11 determines that a flow in the backward flow direction X2 has occurred and that when the value obtained by applying decrease correction to the first amplitude increase signal Vf1 by the negative-side coefficient multiplication signal Vfk1 is not smaller than the no-air-flow output Vc/2, the signal correction processing unit 11 determines that no flow in the backward flow direction X2 has occurred.

Various modifications and alterations of this invention will be apparent to those skilled in the art without departing from the scope and spirit of this invention, and it should be understood that this is not limited to the illustrative embodiments set forth herein.

What is claimed is:

1. A thermal-type airflow meter comprising:
    a bypass flow path that is disposed in an intake pipe through which intake air to be taken into an internal combustion engine flows, that takes in part of the intake air, and that makes the intake air flow therethrough;
    a sensor circuit having a flow rate detection device disposed. in the bypass flow path; and
    a signal processing calculator that processes an output signal of the sensor circuit,
    wherein the bypass flow path makes air flow in a direction that corresponds to a forward flow direction or a backward flow direction of the intake air in the intake pipe,
    wherein the sensor circuit has, as the flow rate detection device, an upstream heating resistor, which is a heating resistor at the upstream side in the forward flow direction, and a downstream heating resistor, which is a heating resistor disposed at the downstream side of the upstream heating resistor in the forward flow direction, and has a differential current output circuit that creates an output signal in accordance with the difference between an upstream current that flows in the upstream heating resistor in order to maintain the voltage across the upstream heating resistor to be a preliminarily set upstream voltage value and a downstream current that flows in the downstream heating resistor in order to maintain the voltage across the downstream heating resistor to be a preliminarily set downstream voltage value,
    wherein the signal processing calculator includes
        a response correction calculator that outputs an amplitude increase signal obtained by applying amplitude increase processing of AC components to as output signal of the sensor circuit,
        a comparison signal output calculator that compares the amplitude increase signal with a preliminarily set comparison. threshold value and then outputs one or both of a negative-side comparison signal in accordance with the negative portion, of the amplitude increase signal, that is at the negative side of the comparison threshold value and a positive-side comparison signal is accordance with the positive portion, of the amplitude increase signal, that is at the positive side of the comparison threshold value,
        an averaging processing calculator that outputs an average signal obtained by averaging the comparison signal,
        a coefficient multiplication processing calculator that outputs a coefficient multiplication signal obtained by multiplying the average signal by a preliminarily set adjustment coefficient, and
        a signal correction processing calculator that outputs, as a flow rate signal, a value obtained by applying decrease processing or increase processing to the amplitude increase signal by the coefficient multiplication signal.

2. The thermal-type airflow meter according to claim 1, wherein the signal correction processing calculator outputs, as the flow rate signal, a value obtained by applying decrease correction to the amplitude increase signal by the coefficient multiplication signal processed using the negative-side comparison signal; alternatively, the signal correction processing calculator outputs, as the flow rate signal, a value obtained by applying increase correction to the amplitude increase signal by the coefficient multiplication signal processed using the positive-side comparison signal.

3. The thermal-type airflow meter according to claim 1, wherein when determining based on the output signal of the sensor circuit that a flow in the backward flow direction exists, the signal correction processing calculator outputs, as the flow rate signal, a value obtained by applying decrease correction to the amplitude increase signal by the coefficient multiplication signal processed using the negative-side comparison signal; when determining based on the output signal of the sensor circuit that no flow in the backward flow direction exists, the signal correction processing calculator outputs, as the flow rate signal, a value obtained by applying increase correction to the amplitude increase signal by the coefficient multiplication signal processed using the positive-side comparison signal.

4. The thermal-type airflow meter according to claim 1, wherein in the case where the absolute value of the negative-side coefficient multiplication signal processed using the negative-side comparison signal is larger than a preliminarily set increase/decrease determination threshold value, the signal correction processing calculator outputs, as the flow rate signal, a value obtained by applying decrease correction to the amplitude increase signal by the negative-side coefficient multiplication signal; in the case where the absolute value of the negative-side coefficient multiplication signal is smaller than the increase/decrease determination threshold value, the signal correction processing calculator outputs, as the flow rate signal, a value obtained by applying increase correction to the amplitude increase signal by the positive-side coefficient multiplication signal.

5. The thermal-type airflow meter according to claim 1,
    wherein the response correction calculator outputs a first amplitude increase signal obtained by applying a first amplitude increase processing of the AC components to the output signal of the sensor circuit and a second amplitude increase signal obtained by applying a second amplitude increase processing of the AC components to the output signal of the sensor circuit,
    wherein the comparison signal output calculator compares the second amplitude increase signal with the comparison threshold value and then outputs one or both of the negative-side comparison signal and the positive-side comparison signal, and
    wherein the signal correction processing calculator outputs, as the flow rate signal, a value obtained by applying decrease correction or increase correction to the first amplitude increase signal by the coefficient multiplication signal.

6. The thermal-type airflow meter according to claim 1, wherein in the case where a flow rate in the forward flow direction is set to a positive value and a flow rate in the backward flow direction is set to a negative value, the sensor circuit has an output characteristic in which the gradient of increase in the output signal to increase in a flow rate decreases as the flow rate increases from "0" and has an output characteristic in which the gradient of decrease in the output signal to decrease in a flow rate decreases as the flow rate decreases from "0".

7. The thermal-type airflow meter according to claim 1, wherein the coefficient multiplication processing calculator changes the adjustment coefficient in accordance with an average output signal obtained by averaging the output signal of the sensor circuit.

8. The thermal-type airflow meter according to claim 1, wherein the comparison signal output calculator changes the comparison threshold value in accordance with the average output signal obtained by averaging the output signal of the sensor circuit.

9. The thermal-type airflow meter according to claim 1, wherein the averaging processing calculator outputs, as the comparison signal, a rectangular wave in accordance with a negative portion or a positive portion of the amplitude increase signal.

10. The thermal-type airflow meter according to claim 9, wherein the averaging processing calculator changes a wave height value of the rectangular wave in accordance with the average output signal obtained by averaging the output signal of the sensor circuit.

* * * * *